(12) United States Patent
Lindoff et al.

(10) Patent No.: US 11,012,270 B2
(45) Date of Patent: May 18, 2021

(54) WINDOW/FILTER ADAPTATION IN FREQUENCY-MULTIPLEXED OFDM-BASED TRANSMISSION SYSTEMS

(71) Applicant: Telefonaktiebolaget LM Ericsson (publ), Stockholm (SE)

(72) Inventors: Bengt Lindoff, Bjärred (SE); Shehzad Ali Ashraf, Aachen (DE); Robert Baldemair, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 110 days.

(21) Appl. No.: 15/742,120

(22) PCT Filed: Oct. 13, 2015

(86) PCT No.: PCT/EP2015/073684
§ 371 (c)(1),
(2) Date: Jan. 5, 2018

(87) PCT Pub. No.: WO2017/005331
PCT Pub. Date: Jan. 12, 2017

(65) Prior Publication Data
US 2018/0198649 A1 Jul. 12, 2018

(30) Foreign Application Priority Data
Jul. 6, 2015 (WO) ................. PCT/EP2015/065378

(51) Int. Cl.
*H04W 4/00* (2018.01)
*H04L 27/00* (2006.01)
(Continued)

(52) U.S. Cl.
CPC ........ *H04L 27/0008* (2013.01); *H04L 5/0028* (2013.01); *H04L 5/0064* (2013.01);
(Continued)

(58) Field of Classification Search
USPC ....... 370/204, 229, 230, 236, 252, 290, 328, 370/330, 395.4, 465, 468
See application file for complete search history.

(56) References Cited

U.S. PATENT DOCUMENTS 5,369,637 A * 11/1994 Richardson .......... H04B 7/2643
370/281
10,075,309 B2 * 9/2018 Chen ..................... H04L 1/0003
(Continued)

OTHER PUBLICATIONS

Unknown, Author, "Correction to RF General section on CA configurations", 3GPP TSG-RAN WG5 Meeting #64, R5-144809, Dresden, Germany, Aug. 18-22, 2014, 1-22.
(Continued)

*Primary Examiner* — Nguyen H Ngo
(74) *Attorney, Agent, or Firm* — Murphy, Bilak & Homiller, PLLC

(57) ABSTRACT

Techniques are disclosed for adaptively determining windowing functions and/or filtering functions in a system that uses multiple multicarrier modulation numerologies. According to one aspect, a method comprises determining (1610) first and second quantities of frequency resources needed for first and second multicarrier modulation schemes, respectively, the first and second multicarrier modulation schemes having first and second subcarrier spacings, respectively, the first subcarrier spacing differing from the second subcarrier spacing; determining (1620) a first windowing function and/or first filtering function, for use with the first multicarrier modulation scheme, based on at least one of the first and second quantities of frequency resources; and transmitting (1630) a multi-mode multi-carrier modulation signal in a frequency band, during the first interval, using the first and second multicarrier modulation schemes and the first and second quantities of frequency resources. Transmitting the multi-mode multi-carrier
(Continued)

modulation signal comprises applying the first windowing and/or first filtering function to the first multicarrier modulation scheme.

20 Claims, 19 Drawing Sheets

(51) Int. Cl.
    *H04L 5/00*     (2006.01)
    *H04L 27/26*     (2006.01)
    *H04W 16/14*     (2009.01)
    *H04L 1/00*     (2006.01)

(52) U.S. Cl.
    CPC .......... *H04L 5/0087* (2013.01); *H04L 5/0091* (2013.01); *H04L 27/0012* (2013.01); *H04L 27/264* (2013.01); *H04W 16/14* (2013.01); *H04L 1/00* (2013.01); *H04L 5/006* (2013.01); *H04L 5/0007* (2013.01); *H04L 5/0066* (2013.01); *H04L 5/0085* (2013.01)

(56) References Cited

U.S. PATENT DOCUMENTS

| | | | | |
|---|---|---|---|---|
| 2003/0169825 A1* | 9/2003 | Wenzel | ............... | H04L 27/0008 375/260 |
| 2003/0171102 A1* | 9/2003 | Yang | ................... | H04L 27/2332 455/150.1 |
| 2003/0210645 A1* | 11/2003 | Gummadi | ........... | H04L 27/2657 370/203 |
| 2004/0263365 A1* | 12/2004 | Robinson | ............ | H03M 7/3015 341/77 |
| 2005/0020217 A1* | 1/2005 | Khoini-Poorfard | ......................... | H04B 1/0475 455/115.1 |
| 2005/0152465 A1* | 7/2005 | Maltsev | ................ | H04L 5/0046 375/260 |
| 2005/0215206 A1* | 9/2005 | Granstrom | ........... | H04B 1/0483 455/102 |
| 2005/0249312 A1* | 11/2005 | Bode | ................... | H04L 27/0008 375/308 |
| 2005/0260998 A1* | 11/2005 | Casaccia | ........... | H04W 72/1231 455/452.2 |
| 2005/0286653 A1* | 12/2005 | Lai | ....................... | H04L 27/0008 375/308 |
| 2006/0008017 A1 | 1/2006 | Balakrishnan et al. | | |
| 2006/0215789 A1* | 9/2006 | Ghosh | .................... | H04L 1/206 375/329 |
| 2007/0298731 A1* | 12/2007 | Zolfaghari | ........... | H04B 1/0067 455/91 |
| 2008/0039133 A1 | 2/2008 | Ma et al. | | |
| 2008/0253349 A1* | 10/2008 | Yu | ....................... | H04L 27/0008 370/345 |
| 2009/0285086 A1* | 11/2009 | Adachi | ............... | H04L 27/2665 370/210 |
| 2010/0069009 A1 | 3/2010 | Bloebaum et al. | | |
| 2010/0246564 A1* | 9/2010 | Vrcelj | ................. | H04L 25/0212 370/350 |
| 2013/0114527 A1 | 5/2013 | Yin et al. | | |
| 2013/0129017 A1 | 5/2013 | Sahin et al. | | |
| 2015/0071050 A1 | 3/2015 | Iranzo | | |
| 2015/0256308 A1* | 9/2015 | Ma | ....................... | H04B 7/2615 370/330 |
| 2016/0191105 A1* | 6/2016 | King | ........................ | H03F 3/19 455/552.1 |
| 2016/0294521 A1* | 10/2016 | Au | ....................... | H04L 27/2602 |
| 2016/0352551 A1* | 12/2016 | Zhang | .................. | H04L 5/0007 |

OTHER PUBLICATIONS

Unknown, Author, "Discussion on Scalable UMTS", 3GPP TSG-RAN WG1 Meeting #72, R1-130412, St. Julian's, Malta, Jan. 28-Feb. 1, 2013, 1-20.

Unknown, Author, "Impact of cross-carrier scheduling", 3GPP TSG-RAN WG2 #68, R2-096500, Jeju, Korea, Nov. 9-13, 2009, 1-5.

* cited by examiner

WINDOW/FILTER ADAPTATION IN FREQUENCY-MULTIPLEXED OFDM-BASED TRANSMISSION SYSTEMS

TECHNICAL FIELD

The present invention generally relates to wireless communication networks, and particularly relates to frequency multiplexing of multiple Orthogonal Frequency-Division Multiplexing (OFDM) modulation schemes.

BACKGROUND

The so-called Long Term Evolution (LTE) wireless communication networks developed by members of the 3rd-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing/bandwidth as the downlink and the same number of single carrier FDMA (SC-FDMA) symbols in the time domain as OFDM symbols in the downlink.

In the time domain, LTE downlink transmissions are organized into radio frames of 10 milliseconds, each radio frame consisting of ten equally-sized subframes of length Tsubframe=1 millisecond, as shown in FIG. 2. For normal cyclic prefix, one subframe consists of 14 OFDM symbols. The duration of each symbol is approximately 71.4 microseconds.

Furthermore, the resource allocation in LTE is typically described in terms of resource blocks, where a resource block corresponds to one slot (0.5 milliseconds) in the time domain and 12 contiguous subcarriers in the frequency domain. A pair of two adjacent resource blocks in time direction (1.0 milliseconds) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of the control information. A downlink system with CFI=3 OFDM symbols as control is illustrated in FIG. 3.

The reference symbols shown in FIG. 3 are the cell specific reference symbols (CRS) and are used to support multiple functions including fine time and frequency synchronization and channel estimation for certain transmission modes.

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices, continue to be developed. These market forces indicate that a wireless communications technology with improved flexibility is needed, to better match the variety of service requirements for mobile data applications.

SUMMARY

Techniques are disclosed for adaptively determining windowing functions and/or filtering functions in a system that uses multiple multicarrier modulation numerologies. According to a first aspect, an example method comprises determining first and second quantities of frequency resources needed for first and second multicarrier modulation schemes, respectively, the first and second multicarrier modulation schemes having first and second subcarrier spacings, respectively, the first subcarrier spacing differing from the second subcarrier spacing. The example method further comprises determining a first windowing function and/or first filtering function, for use with the first multicarrier modulation scheme, based on at least one of the first and second quantities of frequency resources, and transmitting a multi-mode multi-carrier modulation signal in a frequency band, during the first time interval, using the first and second multicarrier modulation schemes and the first and second quantities of frequency resources. Transmitting the multi-mode multi-carrier modulation signal comprises applying the first windowing and/or first filtering function to the first multicarrier modulation scheme.

A second aspect is related to methods in a first wireless node operating in a wireless communication system in which at least first and second multicarrier modulation schemes having different subcarrier spacings are used. An example method according to this aspect includes determining, for a first time interval, a windowing function and/or filtering function to be applied in receiving a signal transmitted according to the first multicarrier modulation scheme. This example method further includes receiving, in a frequency band, a signal comprising data transmitted in first time-frequency resources according to the first multicarrier modulation scheme, wherein receiving the signal comprises applying the determined windowing function and/or filtering scheme to the signal. In some embodiments, this example method further includes transmitting to a second wireless node, prior to said receiving, a scheduling grant for use by the second wireless node in transmitting the signal. The scheduling grant indicates or implies the windowing function and/or filtering function to be used by the second wireless node for transmitting the signal. In other embodiments, the method further includes receiving information about the first multicarrier modulation scheme and the first time-frequency resources in a scheduling grant received from a second wireless node. Again, the scheduling grant indicates or implies the windowing function and/or filtering function to be applied by the first wireless node to the signal.

A third aspect is also related to methods in a first wireless node operating in a wireless communication system in which at least first and second multicarrier modulation schemes having different subcarrier spacings are used. An example method according to this aspect includes receiving a transmission grant from a second wireless node, the transmission grant comprising information about allocated time-frequency resources for use by the first wireless node in a first time interval. The method further includes determining a windowing function and/or filtering function to be applied by the first wireless node in transmitting in the first time interval. Finally, the method includes transmitting, in the first time interval and in a frequency band, a signal comprising data transmitted in the allocated time-frequency resources according to the first multicarrier modulation scheme. Transmitting the signal comprises applying the windowing function and/or filtering scheme to the signal.

A fourth aspect of the presently disclosed techniques relates to a wireless node adapted to carry out a method according to the first aspect above. Similarly, a fifth aspect relates to a wireless node adapted to carry out a method according to the second aspect above, while a sixth aspect relates to a wireless node adapted to carry out a method according to the third aspect. Other aspects relate to corresponding computer program products and computer-readable media carrying such computer program products.

Various other methods and apparatus corresponding to the above aspects are detailed herein, as are additional details and refinements of these aspects. Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
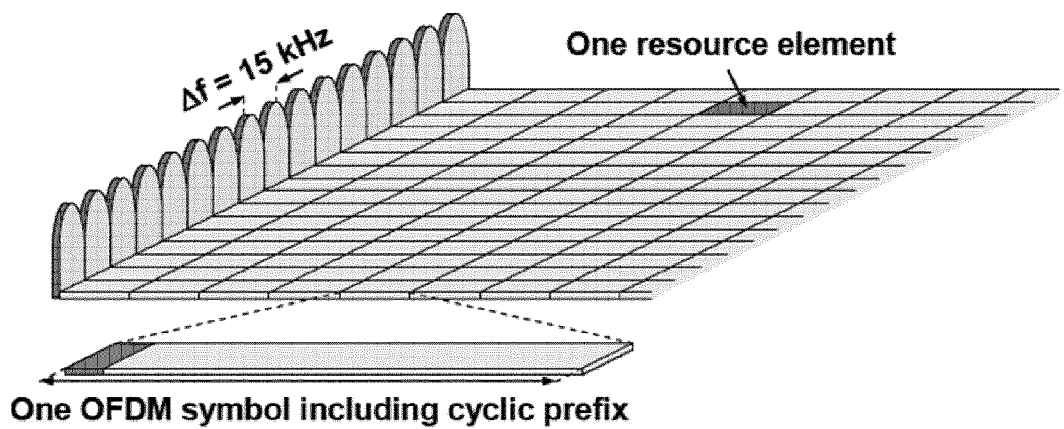
FIG. 1 illustrates a diagram illustrating an LTE downlink physical resource.
Figure 2:
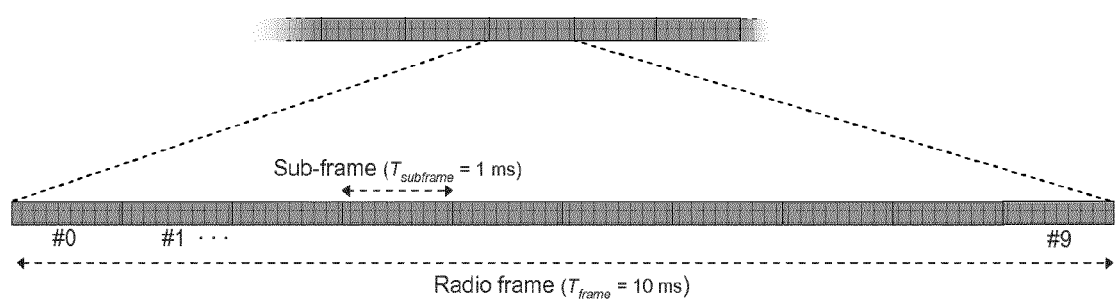
FIG. 2 illustrates a diagram of an LTE time-domain structure.
Figure 3:
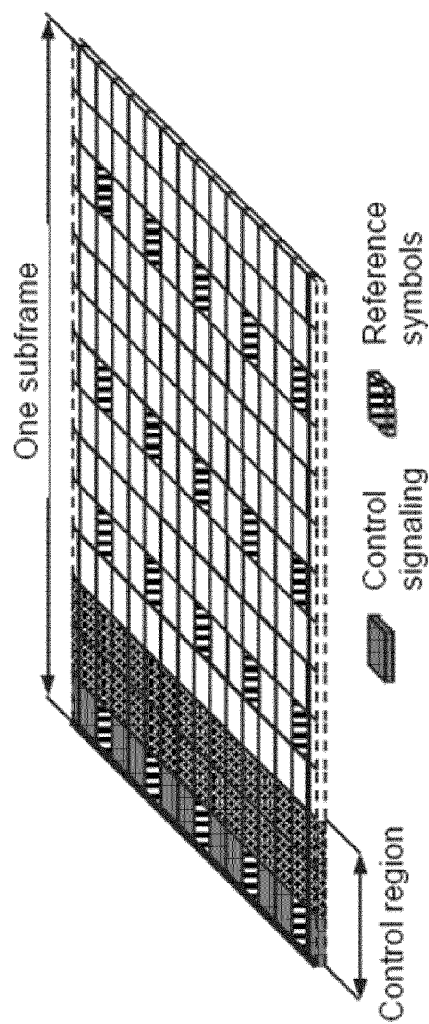
FIG. 3 illustrates a diagram of a downlink subframe.

There has been a rapid growth in the number of wireless devices and applications in recent years, and this trend is highly likely to continue in the future. This growth signals a need for a new radio access technology (RAT), which may be regarded as a "5G" ($5^{th}$-generation) wireless technology. One of the key goals of the current plans for 5G is to expand services offered by the network beyond mobile broadband (MBB). New use cases may come with new requirements. At the same time, 5G should also support a very wide frequency range and be very flexible when it comes to deployment options.

With the emergence of new applications with highly varying application needs, i.e., quality-of-service (QoS) parameters and deployment scenarios, a single, inflexible, physical-layer technology is not adequate to achieve the desired performance characteristics. For example, it is clear that some services require a shorter transmission time interval (TTI), compared to LTE, in order to reduce latency. In an OFDM system, shorter TTIs may be realized by changing subcarrier spacing or subcarrier bandwidth. (The terms subcarrier spacing and subcarrier bandwidth are used interchangeably herein.) Other services need support of relaxed synchronization requirements or very high robustness to delay spread—this may be done, in a system operating with cyclic prefix, by extending the cyclic prefix. These are just examples of possible requirements.

It is clear, however, that selecting parameters such as subcarrier spacing and cyclic prefix lengths is a tradeoff between conflicting goals. Thus, a radio access technology, e.g., the next generation, or "5G," RAT, advantageously provides flexible support for several variants of transmission parameters, commonly called "numerologies." Such transmission parameters might be symbol duration, which directly relates to subcarrier spacing in an OFDM system and in several other multicarrier modulation systems, number of subcarriers, or cyclic prefix duration.

Furthermore, it is beneficial to be able to simultaneously support several services on the same band. This allows for a dynamic allocation of resources (bandwidth for example) between the different services, and for efficient implementation and deployment. Thus, the techniques described herein provide for the simultaneous use of two or more differing multicarrier modulation schemes, i.e., the use of two or more multicarrier modulation schemes having different numerologies, on the same transmission band.

In this context, a highly flexible physical layer for a future generation of cellular networks is currently being designed. This physical layer design is geared towards fulfilling a wide range of varying QoS requirements including latency, reliability and throughput. In this new physical layer design, the scalability is proposed to be adapted using different subcarrier spacing. Another feature is that it should support mixed-mode operation, which allows different subcarrier spacings to simultaneously coexist within the same frequency band. This technique is referred to as multi-mode multicarrier modulation or as involving multiple multicarrier modulation schemes; in this context, the terms "multicarrier modulation scheme" and "multicarrier modulation mode" should be regarded as interchangeable.

The essence of the mixed-mode operation contemplated herein is as follows: At a transmitting node, two or more multicarrier signals are generated, each being composed of one or more symbols, but the multicarrier signals having different transmission parameters, or numerologies, e.g., with respect to subcarrier spacing and/or symbol duration. In some embodiments, the symbol durations for the two signals (and other parameters for the signals) may be selected so that symbol borders align periodically, even though the symbol durations for the two signals may vary. For instance, alignment may be achieved with a 1 millisecond periodicity—this provides a good match to existing LTE techniques, so that LTE signals can be combined, in the same frequency band, with one or more other multicarrier signals having different subcarrier spacings and/or symbol durations.

Thus, in future networks (broadly referred to as "5G" networks), multi-mode multicarrier configuration is envisioned to meet the varying QoS requirements of different applications and services. New numerology for a new physical layer design to support these 5G networks is currently being proposed—this new numerology can support different subcarrier spacings (or, correspondingly, different OFDM symbol sizes), in different parts of the same transmission band. The different numerologies may be defined in a way such that different OFDM symbol lengths fit together very well, so as to facilitate inter-operability of different OFDM configurations.

Even though several of the specific examples provided herein are based on the use of OFDM as the base multicarrier modulation scheme, the techniques applies equally well if some or all of the signals are precoded OFDM transmissions, such as Discrete Fourier Transform Spread OFDM (DFTS-OFDM), which is also known as single-carrier frequency-division multiple access (SC-FDMA). It will be appreciated that the term "multicarrier modulation," as used herein, refers to any of these schemes as well as to other multicarrier modulation schemes. Thus, references herein to different multicarrier modulation schemes may refer to differences in the underlying modulation technique, or to differences in the multicarrier modulation parameters (e.g., symbol duration and/or subcarrier spacings), or both.

The techniques described herein pertain to a system that, in some embodiments, is configured to transmit multiple multicarrier signals simultaneously, the signals having different multicarrier modulation parameters (numerologies), e.g., with respect to symbol length, subcarrier spacing, etc. Each signal consists of a sequence of symbols (for example OFDM symbols) and guard periods (for example cyclic prefixes or guard periods consisting of zeros).

Figure 4:
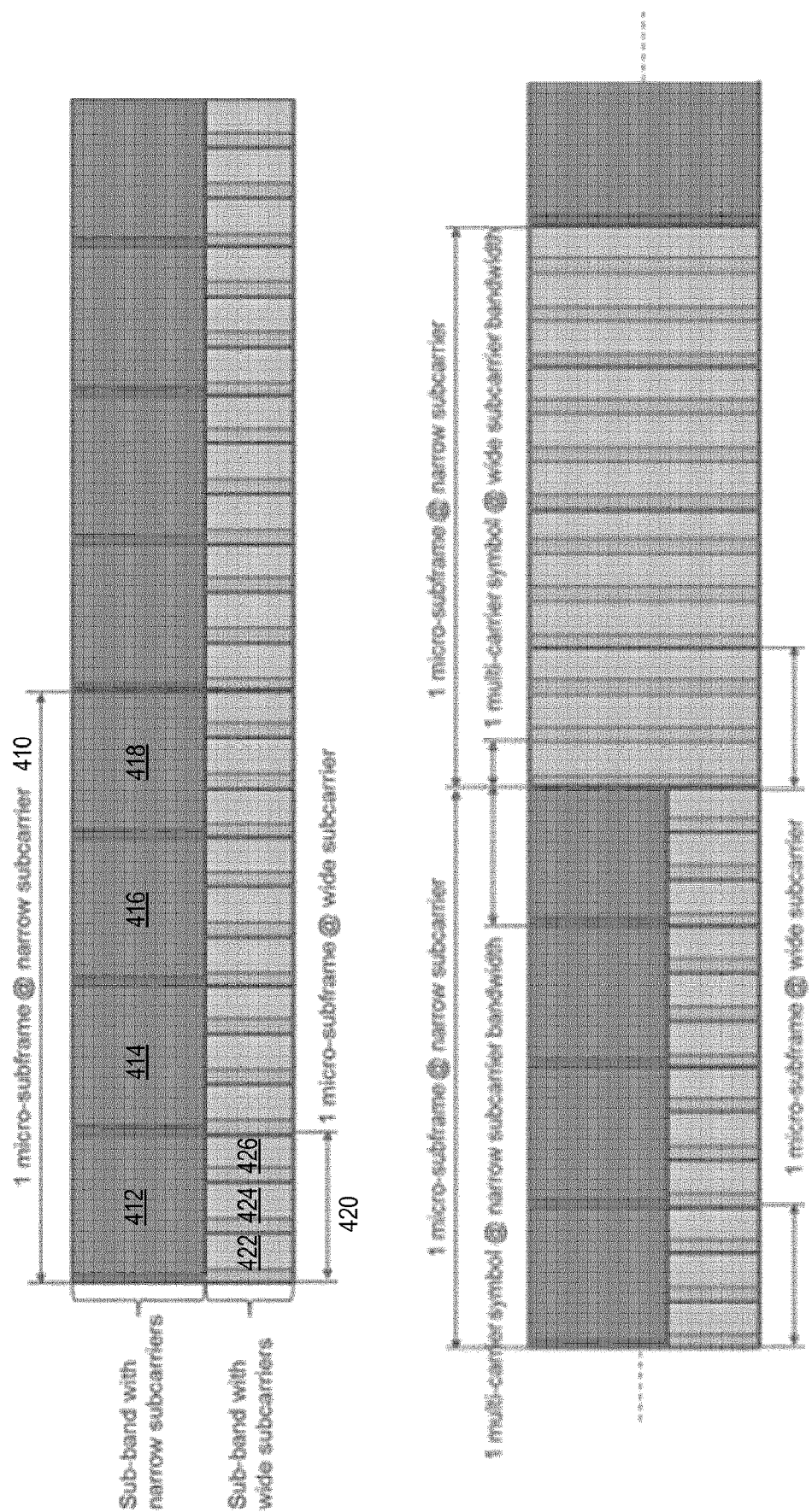
FIG. 4 illustrates multi-mode multicarrier modulation configurations, according to some embodiments.

FIG. 4 illustrates two cases of multi-mode configurations, as a non-limiting example of how a transmitting node may simultaneously employ two multicarrier modulation schemes. Here, "micro-subframes" are defined—each micro-subframe can be equal to a few OFDM symbols. As an example, one micro-subframe 410 in FIG. 4 is shown to consist of four "long" OFDM symbols 412, 414, 416 and 418. (Each symbol in the illustration includes a cyclic prefix.) The new numerology allows inter-operability of different multicarrier modulation modes, characterized by different sub-carrier spacings and/or different symbol lengths. In the example illustrated in the top portion of FIG. 4, one micro-subframe 410 with narrow subcarrier spacing and correspondingly long OFDM symbols 412, 414, 416, and 418, is equal to four micro-subframes 420 with wide subcarrier spacing and correspondingly short OFDM symbols 422, 424, 426, etc. In the illustrated example, then, the symbols are aligned, once per each larger micro-subframe. Note that the bottom portion of FIG. 4 illustrates a scenario where the multi-mode multicarrier scheme is changed from one time interval to another. In a first part of the bottom portion of FIG. 4, two sub-bands with different subcarrier spacing are frequency multiplexed. Subsequently, however, the same frequency spectrum is used with only one subcarrier spacing.

It should be noted that while FIG. 4 illustrates examples where two multicarrier modulation modes are used, more than two modes can also be supported in a mixed mode OFDM framework. Those familiar with the details of OFDM modulators and demodulators will appreciate that the mode selection, i.e., the selection of the OFDM symbol length and the sub-carrier spacing for a given multicarrier modulation mode, can be achieved by appropriate selection of the IFFT/FFT size used to modulate and demodulate the signal, in combination with a given sample rate. In LTE, the subcarrier spacing is fixed at 15 kHz, and the symbol duration is set so that either 7 symbols ("normal" cyclic prefix) or 6 symbols (extended cyclic prefix) fit within a 500 microsecond slot. With the approach planned for this new physical layer, a multicarrier modulation mode like (if not identical to) the OFDM modulation used in LTE can be used in the same frequency band, and at the same time, as one or more other multicarrier modulation modes having, for example, wider subcarrier spacings and shorter symbol lengths.

One of the issues with the existing LTE standard is that it uses a fixed large-sized subframe structure, which results in resource wastage for very small-sized data as is often the case in critical machine-type communication (C-MTC) scenarios. Moreover, due to relatively coarse time granularity, the LTE resource blocks simply do not meet the very low latency requirements of C-MTC applications. A second issue with the existing LTE standard is that all the different services are bound to using the same subframe structure; the subframe cannot be split among different users in order to support any emerging time-critical data services for C-MTC applications.

Both of these issues are addressed by the multi-mode techniques described herein, as generally illustrated in FIG. 4. C-MTC applications can be serviced with, for example, a multicarrier modulation mode having a relatively wide subcarrier spacing and relatively short OFDM symbol lengths, e.g., as compared to those used in LTE. This, in turn, facilitates communication with these applications using relatively shorter micro-subframes, such as the micro-subframes 420 shown in FIG. 4. At the same time, mobile broadband (MBB) applications can be serviced with a separate multicarrier modulation mode, in a disjunct and/or adjacent bandwidth region, having relatively narrower subcarrier spacing and relatively longer OFDM symbol lengths. However the different/separate multicarrier modulation modes can make use of the same or overlapping bandwidth regions at different times.

Figure 5:
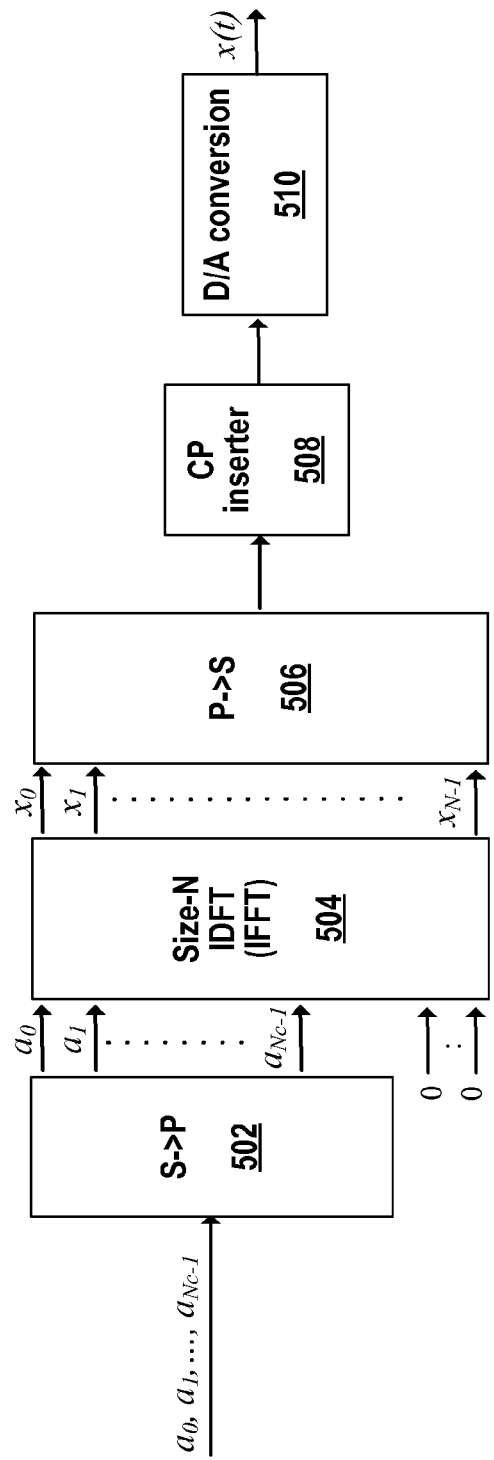
FIG. 5 illustrates a block diagram of an OFDM modulation scheme that can be used in some embodiments.

FIG. 5 illustrates OFDM modulation using an Inverse Fast Fourier Transform (IFFT) or, more generally, and Inverse Discrete Fourier Transform (IDFT). As will be explained in further detail below, two or more simultaneous instantiations of the signal processing configuration shown in FIG. 5 can be used for multi-mode operation. As indicated by the diagrams of FIG. 4, the number of OFDM subcarriers $N_c$ and the subcarrier spacing can vary. The number of subcarriers $N_c$ can range from fewer than a hundred to several thousand, depending on the subcarrier spacing that is selected and the overall transmission bandwidth.

As illustrated by FIG. 5, during each OFDM time interval, $N_c$ modulated symbols $a_0$ to $a_{N_c-1}$ are provided to the size-N IDFT 504 by the serial to parallel converter 502. The IFFT size corresponds to the total number of subcarriers that may be generated; the actual number of generated subcarriers is $N_c$ in FIG. 5.

The parallel output of IDFT 504 is converted to a serial time sequence by parallel-to-serial converter 506. Cyclic prefix inserter 508 inserts a copy of part of the OFDM symbol at the beginning of the OFDM symbol, to make the OFDM signal less sensitive to time dispersion. Following the digital to analog conversion by converter 510, the final output signal x(t) is then prepared for transmission.

Figure 6:
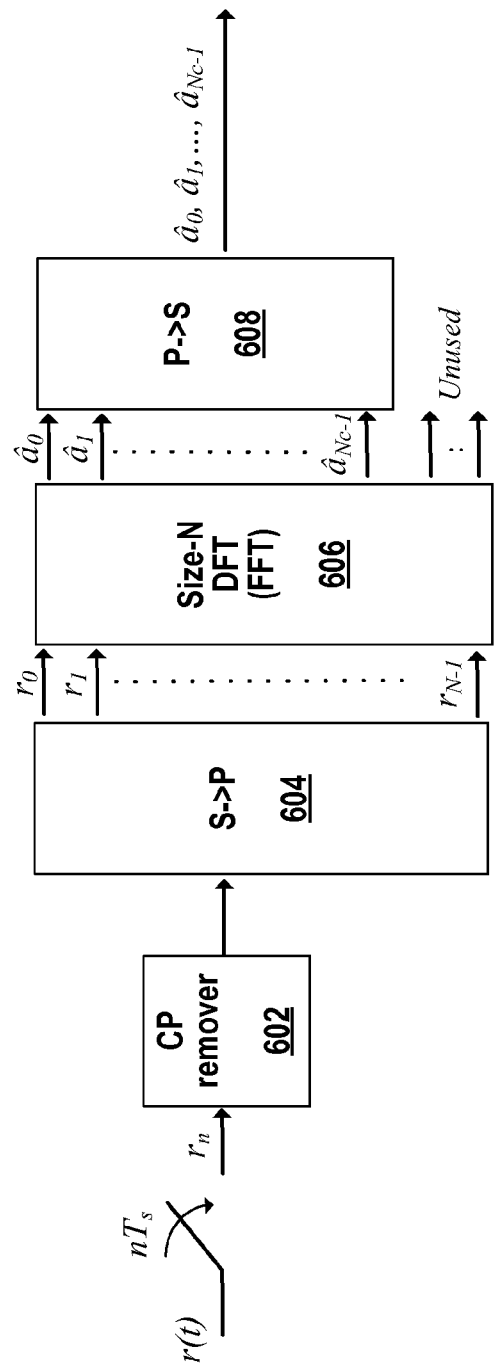
FIG. 6 illustrates a block diagram of an OFDM demodulation scheme that can be used in some embodiments.

FIG. 6 illustrates demodulation using FFT processing or, more generally, DFT processing. The received signal r(t) is sampled, and has its cyclic prefix removed by CP remover 602. The serial to parallel converter 604 provides the samples of the OFDM symbol to the size-N DFT 606, which extracts the data symbol values from the multiple subcarriers of the modulated signal. These data symbols are then converted to a serial stream of data symbols by parallel-to-serial converter 608. These data symbols are then individually demodulated and the resulting data is decoded.

Figure 7:
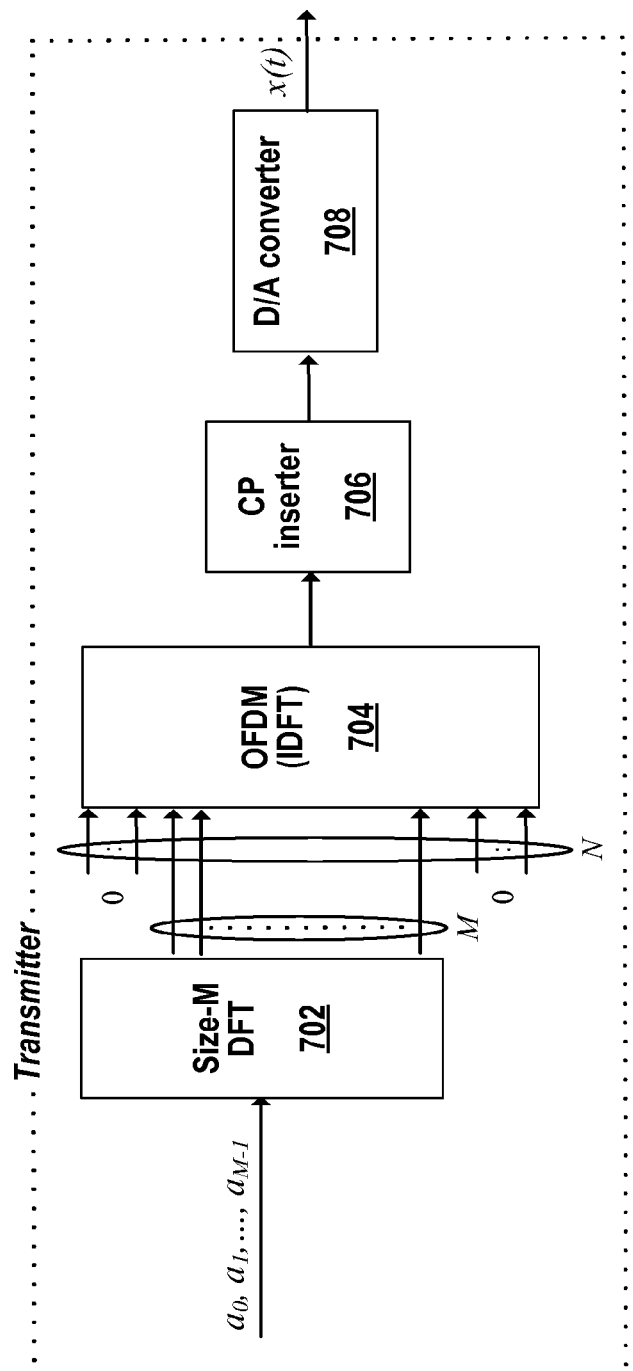
FIG. 7 illustrates a block diagram of a DFTS-OFDM modulation scheme that can be used in some embodiments.

FIG. 7 illustrates OFDM modulation with DFT-based precoding, or DFT-Spread OFDM (DFTS-OFDM), which can be referred to as single-carrier frequency division multiple access (SC-FDMA). A block of M modulation symbols is applied to Size-M DFT 702. The output of the DFT 702 is then applied to inputs of an OFDM modulator 704 that is implemented as a size-N IDFT; each input of the OFDM modulator 704 corresponds to a subcarrier of the resulting modulated signal. After conversion of the IDFT output to a time sequence in OFDM modulator 704, cyclic prefix inserter 706 inserts a cyclic prefix. Finally, output signal x(t) is output following conversion by digital-to-analog converter 708.

Figure 8:
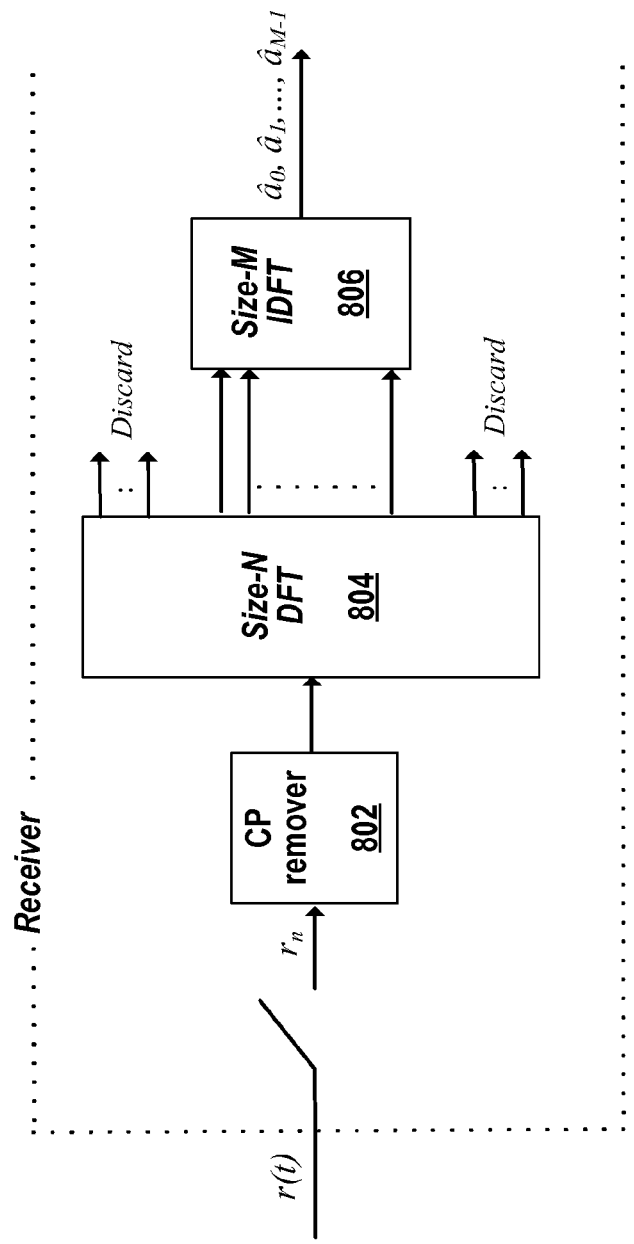
FIG. 8 illustrates a block diagram of a DFTS-OFDM demodulation scheme that can be used in some embodiments.

FIG. 8 illustrates DFTS-OFDM demodulation where a received signal r(t) is processed by cyclic prefix remover 802, Size-N DFT 804 and Size-M IDFT 806. It will be appreciated that the DFTS-OFDM demodulator shown in FIG. 8 is similar to the OFDM demodulator of FIG. 6, but with the size-M IDFT 806 added.

As previously mentioned, although OFDM and DFTS-OFDM are described as example multicarrier modulation/demodulation techniques, the embodiments of the present invention are not limited to such techniques. Also, it is noted that the equalization (which may be done in the frequency domain) is omitted from the figures for simplicity.

Figure 9:
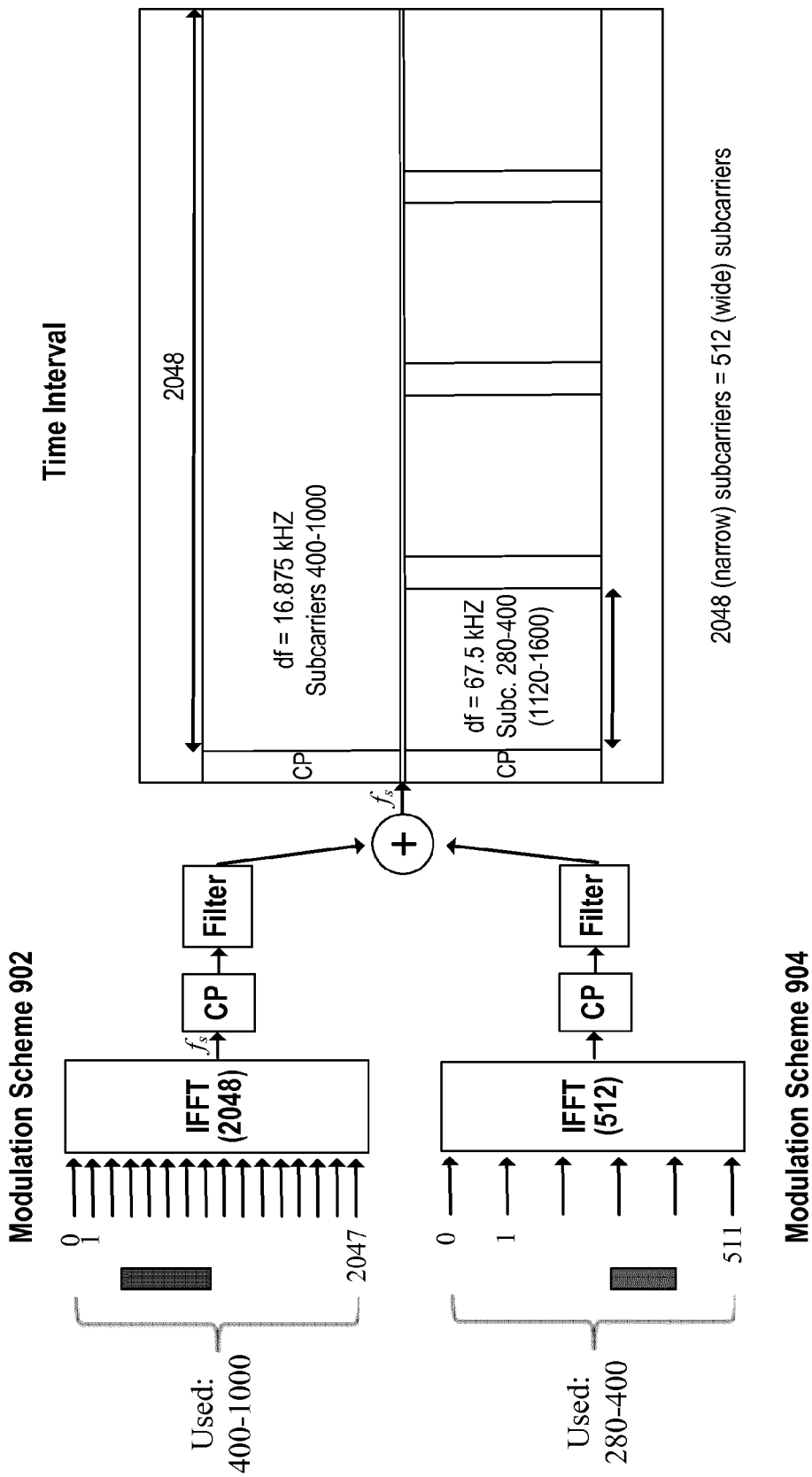
FIG. 9 illustrates signal generation using multiple IFFT modulation schemes in each time interval, according to some embodiments.

The IFFT size can be selected for modulation schemes with different numerologies, or variants of transmission parameters. The resulting allocations can provide for symbols with different subcarrier spacings in different frequency band portions of the same time interval. For example, FIG. 9 shows two simultaneously applied multicarrier modulators 902 and 904. Modulator 902 operates with an IFFT size of 2048, and is capable of outputting 2048 relatively narrow modulated subcarriers, while modulator 904 operates with an IFFT size of 512. Modulator 904 produces up to 512 subcarriers that are four times as wide as those from modulator 902, while also producing symbols that are one-fourth as length.

In the illustrated example, subcarriers 400-1000 of modulator 902 are generated, each having a bandwidth of 16.875 kHz, while the subcarriers 280-400 from modulator 904 each have a bandwidth of 67.5 kHz. It will be appreciated that the ranges of inputs used in modulators 902 and 904 are selected so that the resulting subcarriers do not land on each other. In the illustrated example, the 121 relatively wide subcarriers from modulator 904 correspond to the portion of the spectrum that would be occupied by subcarriers 1120-1600 of modulator 902. The corresponding inputs of modulator are thus not used. This provides a small gap in the frequency domain, i.e., a guard band, between the outputs from the two multicarrier modulators, which means that the two modulated signals can simply be added to one another, in the time domain, before transmission. The result is that in a given time interval, modulation scheme 902 provides longer blocks of symbols for a first non-overlapping portion of the frequency band, while modulation scheme 904 provides shorter blocks of symbols in a greater number of spacings in a second non-overlapping portion of the frequency band. As a result, symbols can be directed to different receiver nodes using different subcarrier spacings, all within the same time interval.

Thus, different multicarrier modulation schemes, or modes, may be used for different portions of the frequency band. More particularly, this means that a first portion of the frequency band can contain a first signal having a first integer number of symbol intervals in each of one or more time intervals of a predetermined length, while a second portion of the band simultaneously contains a second signal having a second integer number of symbol intervals in each of the one or more time intervals of the predetermined length, the second integer number differing from the first integer number. These signals can be simultaneously transmitted in the frequency band, such that the first and second signals are frequency-domain multiplexed in the frequency band. Further, this may be done, in some embodiments, in such a way that a symbol interval starting time in the first signal is aligned with a corresponding symbol interval starting time in the second signal at least once per time interval.

This means that the subcarrier spacing and/or symbol durations can differ in different portions of the frequency band. While two multicarrier modulation modes are combined in the example shown in FIG. 9, it will be appreciated that this can be extended to three, four, or more multicarrier modulation modes, so long as non-colliding portions of the frequency band are allocated to the multiple modulators.

It should be understood that Orthogonal Frequency-Division Multiplexing (OFDM) is but one example of a multicarrier modulation technique. Other examples include discrete-Fourier-transform-spread (DFT-spread- or DFTS-) OFDM, which is also referred to single-carrier frequency-division multiple access (SC-FDMA) or precoded OFDM. Still other examples include filter-bank multicarrier (FBMC) modulation, pre-coded FBMC, and Generalized Frequency-Division Multiplexing (GFDM). Those familiar with these techniques will recognize that the digital signal processing for each of these techniques will vary, but should appreciate that any one or more of these multicarrier modulation techniques may be employed in the multi-mode schemes detailed herein—accordingly, where example embodiments are described herein in terms of OFDM, the described techniques and apparatus may employ one or more other multicarrier modulation techniques in addition to or instead of OFDM.

With the techniques described above, several services can be more optimally supported on the same band. This allows for dynamic allocation of resources (bandwidth for example) between the different services, and for efficient implementation and deployment. A mobile broadband (MBB) terminal may, for example, be served with a subcarrier bandwidth of 16.875 kHz (or 15 kHz). A typical cyclic prefix is less than 5 µs and constitutes an overhead of less than 10%. Another device, e.g., an MTC device, might be served with a subcarrier bandwidth of 67.5 kHz (or 60 kHz, or 75 kHz). To match the same deployment as the MBB terminal, a similar long guard interval is needed. A guard interval can be a cyclic prefix, a known pattern, or a true guard interval consisting of zero-valued samples. In the present disclosure, the term guard interval is used to refer to any of them.

The duration of an OFDM symbol is the inverse of the subcarrier bandwidth, i.e. $1/\Delta f$. In other words, an OFDM symbol with wide subcarriers is shorter than an OFDM symbol with narrow subcarriers. For example, the symbol duration of an OFDM symbol with $\Delta f1=16.875$ kHz is $1/\Delta f1=59$ µs and with $\Delta f2=67.5$ kHz the symbol duration is $1/\Delta f2=15$ µs. A guard interval of 3 µs constitutes an overhead of 5% and 20% for OFDM symbols with $\Delta f1=16.875$ kHz and $\Delta f2=67.5$ kHz wide subcarriers, respectively. The amount of resources (subcarriers) set aside for an MTC service, for example, should be minimized (matched to the amount needed) due to the large overhead. Operating the complete bandwidth with Δf2=67.5 kHz would simplify the communication system (allowing the use of OFDM over the entire bandwidth, and not requiring filtered OFDM or windowed OFDM, as described below) but would have unacceptable performance due to large overhead.

Another use case could be mixing of Δf1=16.875 kHz and Δf2=5.625 kHz (i.e., a numerology with an even narrower subcarrier spacing) for a different kind of MTC service. While the cyclic prefix overhead of this numerology is lower than for Δf1=16.875 kHz, the subcarrier bandwidth is very narrow and supports only slowly moving terminals, due to Doppler robustness. Therefore, the quantity of resources (subcarriers) set aside with Δf2=5.625 kHz should again be matched to the required needs.

One issue with the mixing of numerologies in a single band is that the different numerologies (e.g., OFDM subcarrier bandwidths) are not orthogonal to each other, i.e. a subcarrier with subcarrier bandwidth Δf1 interferes with a subcarrier of bandwidth Δf2. In a technique called filtered OFDM, filtering is introduced to suppress interference between the different numerologies. This may be implemented using a time-domain Finite Impulse Response (FIR) filter, for example. In a technique called windowed OFDM, windowing (in the time domain) is introduced to suppress interference between the different numerologies. The windowing is performed by scaling/weighting time domain samples in the signal.

Filtering—especially with steep transition regions—is tricky for very narrow pass bands. Therefore it is likely that the smallest bandwidth a given numerology can occupy on a band is several subcarriers wide. For example, assume that subcarrier bandwidth Δf1 is used for MBB, while Δf2 is used for another service, e.g., some kind of MTC service. To enable reasonable filtering, the resources (subcarriers) that must be set aside for each numerology must exceed a certain minimum. If the MTC service itself requires fewer resources than the minimum amount dictated by the filtering, these resources are left unused since they cannot be used by MBB terminals that operate only with subcarrier bandwidth Δf1. This leads to an inefficient resource usage.

Another solution to combat the non-orthogonality is to introduce time-domain windowing of the OFDM signal, a technique referred to herein as windowed OFDM. Different windowing techniques are known in the art, but the aim with the windowing is to reduce the out-of-band leakage of an OFDM waveform. Windowed OFDM, just like filtered OFDM, needs a guard band between the different OFDM systems with different numerologies. Note that both windowed OFDM and filtered OFDM could be used, but often only one of the two techniques is applied.

However, quality requirements for OFDM transmission (e.g., as reflected in SINR requirements) vary depending on the service being deployed and the specifics of the deployment. Thus, the guard band and filter/window needed for the different OFDM numerologies may vary, again depending on the service and the network deployment. Hence, a fixed time-domain window (or filter) might not give optimized performance under all or even a wide range of circumstances. Accordingly, there is a need for methods and apparatus to facilitate the dynamic adaption of such parameters, based on service and radio scenarios.

According to some of the embodiments detailed below, then, a network node applies, for a first time interval, two or more multicarrier modulation schemes (e.g., two OFDM schemes with different subcarrier spacings) within a system bandwidth. The numerologies, resource block (RB) allocation, and windowing/filtering functions for the two or more multicarrier modulation schemes are decided based on the current services being provided, quality (e.g., SINR) requirements for the services, and radio channel scenarios. The windowing/filtering function is at least partly a function of the selected numerologies and RB allocation, and hence depends on the guard bands used. Detailed below are network node transmitters and receivers applying these techniques, as well as corresponding device transmitters and receivers. Note that while several of the examples detailed below are specifically directed to embodiments in which two OFDM schemes with different numerologies are used, the techniques and apparatus described herein are applicable and/or readily extended to the use of more than two multicarrier modulation schemes, whether OFDM or SC-FDMA, for example.

Figure 10:
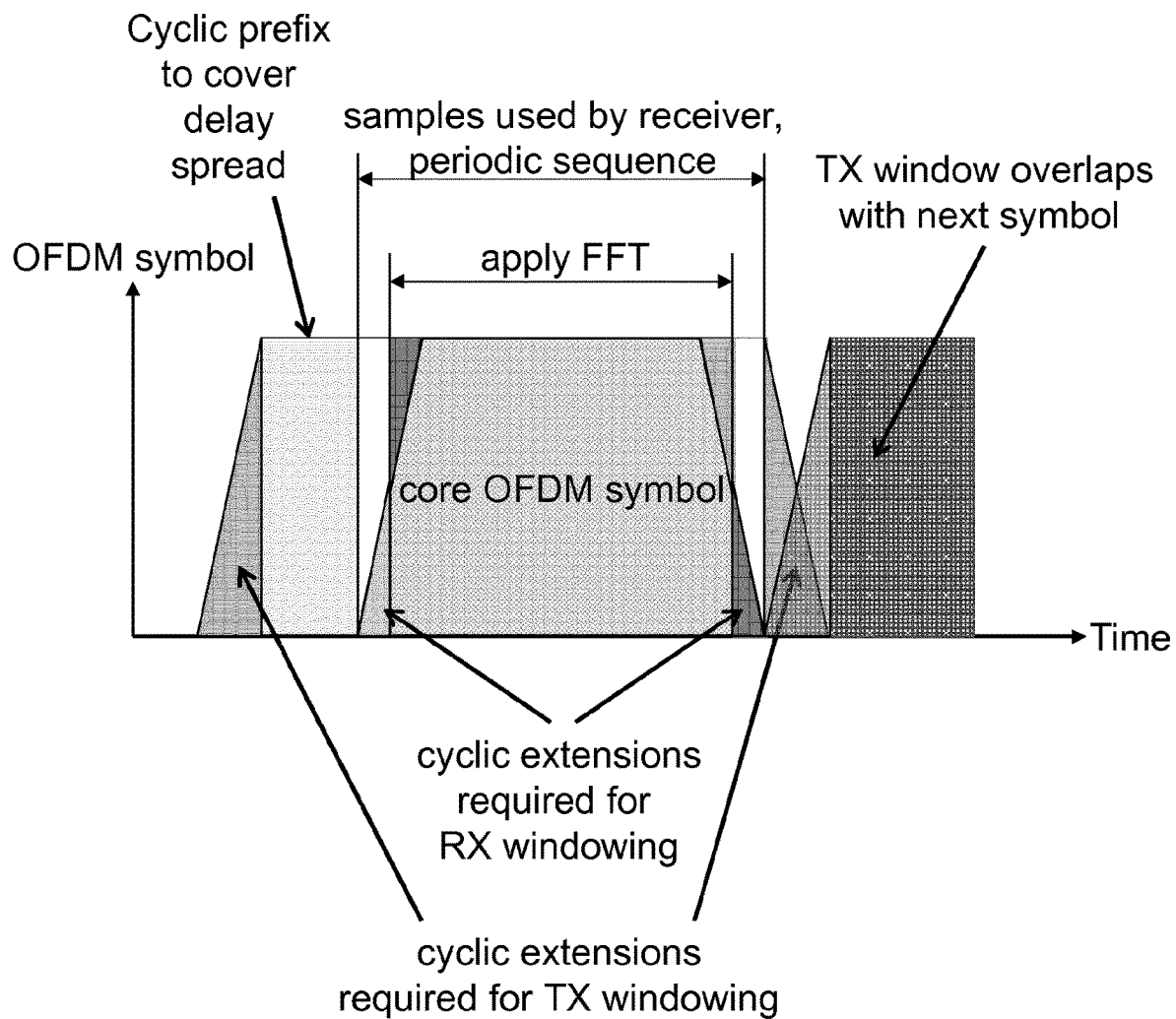
FIG. 10 illustrates the principle of windowed OFDM.

FIG. 10 illustrates the principle of windowed OFDM. A core OFDM symbol is shown in the center of the figure. Cyclic extensions (i.e., copies of a portion of the OFDM symbol from the opposite end of the symbol) are added at the beginning and end of the core OFDM symbol to support subsequent windowing by the transmitter as well as windowing later performed by the receiver; the transmitter also adds an additional cyclic prefix to cover the delay spread of the channel, as is conventionally done in OFDM. The transmitter then applies a windowing function around the extended OFDM symbol—in the illustrated example this is a triangular weighting function, the effects of which are seen at the leftmost and rightmost extremes of the symbol. Generally, the transmitter weighting function comprises the application of weights ranging between 0 and 1 to time domain samples extending into the subsequent and preceding OFDM symbol; the window need not necessarily have a rectangular shape or linear slope. After windowing, the decaying slope of windowed symbol n−1 overlaps with the rising slope of windowed symbol n; since the receiver will be discarding this portion of the signal as received, overlapping the windowed symbols at the transmitter saves overhead.

The windowed OFDM symbol is then transmitted. At the receiver end, the cyclic prefix and the outside cyclic extensions are removed, by limiting the samples used by the receiver to an interval that is shorter than the transmitted symbol length, as shown in the figure. Effectively, the receiver is discarding samples corresponding to the transmitter-windowed samples, as well as the samples corresponding to the regular cyclic prefix. The remaining samples processed by the receiver include samples corresponding to the core OFDM symbol and to those portions of the cyclic extensions that were added to support the receiver windowing. A windowing function is applied to the selected range of samples—again, the function shown in the illustration is a triangular function. Because of the cyclic extensions added to the core OFDM symbol by the transmitter, the symbol after the receiver windowing is still includes all of the original signal information. Thus, the receiver can perform a fast Fourier transform (FFT) on a sequence of data samples within the core OFDM symbol, after the application of the receiver windowing function, and decode the symbol to recover the originally transmitted data.

Figure 11:
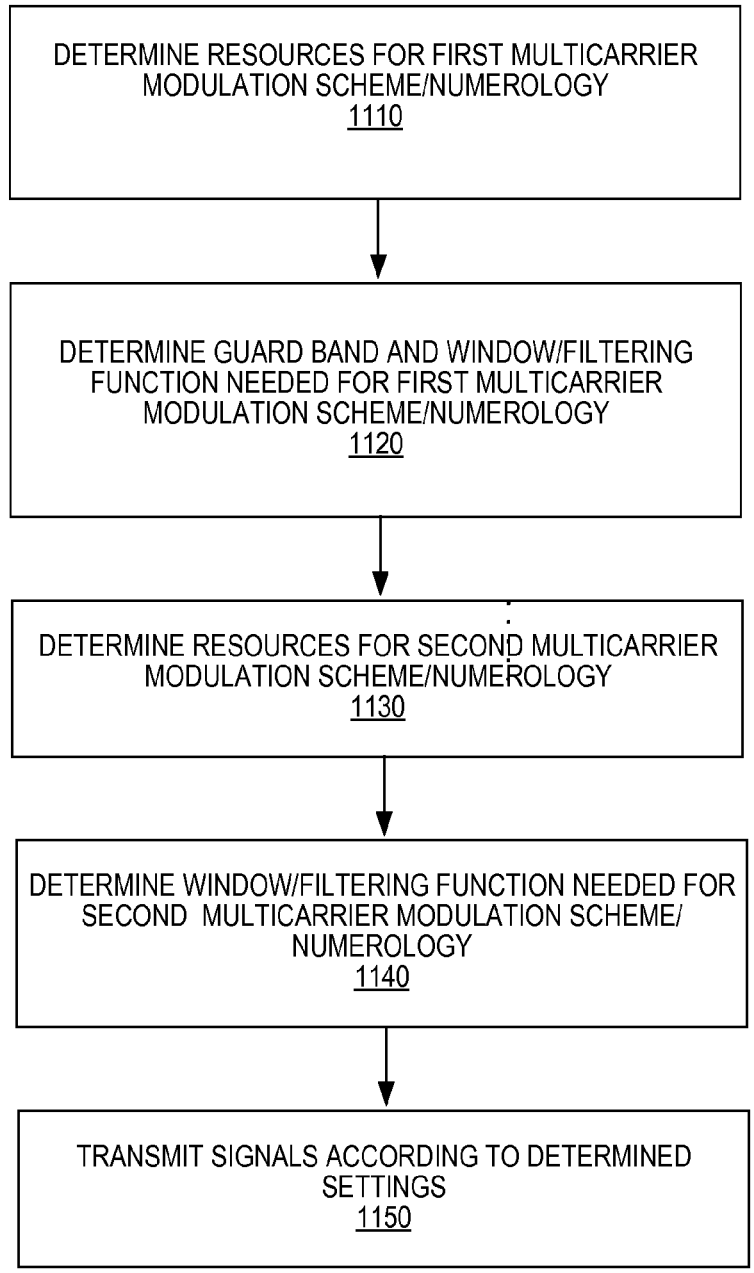
FIGS. 11, 12, 13, 14, 15, 16, 17, and 18 illustrate example methods implemented in wireless nodes, according to various embodiments of the presently disclosed techniques.

FIG. 11 is a process flow chart that illustrates an example of a method that can be carried out in a transmitting node, such as in a base station of a wireless network. As shown at block 1110 of FIG. 11, a controller or other processing circuit in the transmitting node determines, for an upcoming time interval, such as a transmission-time-interval, a subframe, or other time interval, a need for a certain quantity of frequency resources (e.g., resource blocks, or RBs, in an OFDM system) for first and second multicarrier modulation schemes, with different numerologies. These multicarrier modulation schemes may be OFDM modulation schemes with different subcarrier spacings, for example. The frequency resource allocation might be based on a current traffic situation and/or currently used services by the devices, but can also be dependent on the current radio channel characteristics. In some embodiments, a resource allocation for a first numerology is determined first. Then, based on this allocation the second multicarrier modulation scheme/numerology gets the remainder of the total system bandwidth (minus a guard band, as needed)—the allocation of frequency resources to the second multicarrier modulation scheme/numerology is shown at block 1130. In these embodiments, then, the second numerology gets an allocation based on best effort basis. In other embodiments, the allocations may be determined jointly, i.e., based on a tradeoff between the two numerologies needs. In these embodiments, the step shown at block 1130 is performed jointly with the step shown at block 1110.

As shown at block 1120, the transmitting node also determines the needed guard band and the needed windowing/filtering function for the first multicarrier modulation scheme. The windowing/filtering function needed may be a function of the total frequency resource allocation as well as the current services or current radio channel characteristics. For instance, if the transmitting node operates in a cell with small delay spread, the windowing/filtering function may use a larger part of the guard interval between OFDM symbols and hence a smaller guard band for cross interference is needed. On the other hand a deployment with large delay spreads typically corresponds to larger cells with lower allowable signal-to-interference-plus-noise (SINR) values. Shorter filtering/windowing functions are sufficient to achieve the required interference suppression, leaving more of the guard interval to accommodate the channel delay spread. Note that the expected delay spread for a given configuration may be known beforehand, e.g., in the case of a small cell or hot spot, or determined dynamically.

In some embodiment, a long or short guard interval for a multicarrier modulation scheme may also be selected based on a selected windowing/filtering function (in addition to deployment-based selection), to support a particular signal quality (e.g., SINR) target with a particular guard band. For example, to support a high SINR with a low guard band, longer window/filtering may be required, which leads to selection of a long guard interval.

As shown at block 1130, frequency resources for the second multicarrier modulation scheme/numerology are also allocated. In some embodiments, the frequency resource allocation for the second numerology may be made after allocation of the first numerology, and may depend on the first numerology and a determined guard band.

As shown at block 1140, in some embodiments the windowing/filtering function for the second numerology is chosen after allocation of the first numerology. The choice of windowing/filtering function can be made based on the signal quality (e.g., SINR) requirements on the both the first and second numerologies.

Finally, as shown at block 1150, the composite OFDM signal (or, more generally, the multi-mode multicarrier signal) is transmitted according to the determined settings.

Figure 12:
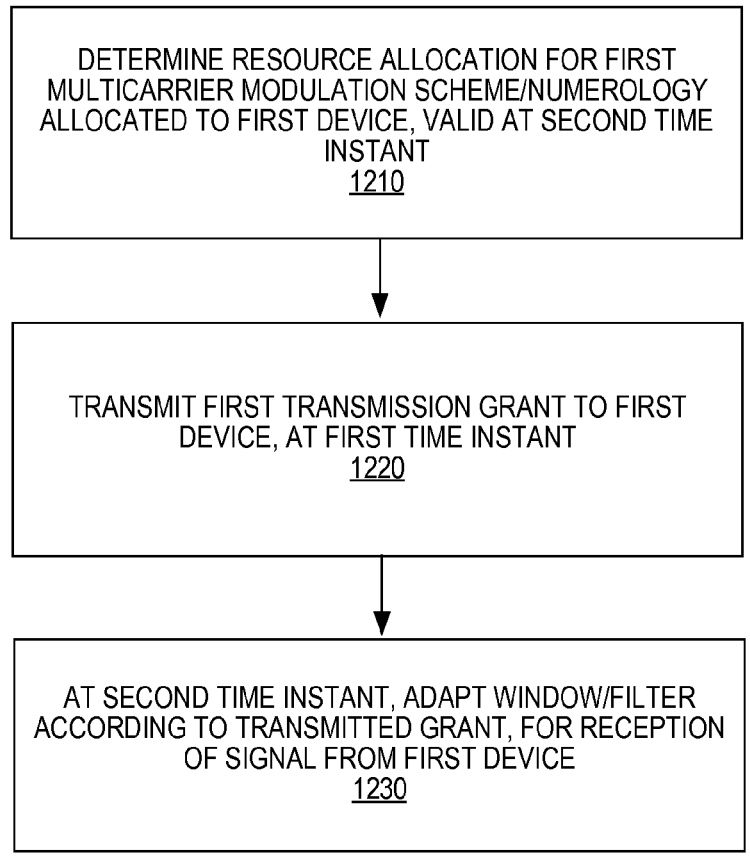

FIG. 12 is a process flow chart that illustrates an example of a method that can be carried out in a node, such as in a base station. As shown at block 1210, a controller or other processing circuit in the node at a first time instant allocates a first system bandwidth and numerology to a first device to be used (valid) for transmission to the receiving node at a second time instant. Also, a windowing/filtering function to use is determined. The windowing/filtering function may be dependent on frequency resource allocation (system allocation), the numerology used, current radio channel characteristics, delay spread, quality requirements (SINR), etc., as well as on a current service used by the first device. For instance, based on the allocated bandwidth and quality requirements, an optimized guard band and windowing/filtering function is determined.

As shown at block 1220, the node then transmits a transmission grant to the first device, including information as described above. The transmission grant is sent in the search space configured for the device. The definition of the search space includes, along with the parameters used in previously existing OFDM systems, the numerology for one of multiple multicarrier schemes/numerology. Depending on a user equipment's (UE's) capabilities, for example, a UE may be configured with search spaces on one or multiple OFDM numerologies.

As shown at block 1230, at a second time instant the receiver of the node is adapted according to the transmitted configuration/setting, for reception of a signal from the first device. The adaptation is of the windowing/filtering function to be used by the receiver in receiving a multicarrier modulation signal from the first device, and is associated to the windowing/filtering setting included in the transmission grant. The received signal is then decoded according to well-known principles for demodulating and decoding multicarrier modulation signals.

Depending on the delay spread of the channel, differently long window/filter can be used. In environments with a small delay spread, longer filters/windows can be used than in environments with long delay spread, when it is considered that both the delay spread and the filter/window must fit in the guard interval. The determination of delay spread can be static (e.g. pico cell, hot spot, etc.), or can dynamically be determined by the receiver. The node may also decide to adapt the filter/window depending on the modulation used in the data transmission; modulation schemes with high spectrum efficiency require high SINR and the NW may choose a window/filter with higher interference suppression (longer window/filter) than for transmissions with lower spectrum efficiency. Furthermore, to support high SINR with longer windows/filters, guard interval length can also be selected accordingly.

Figure 13:
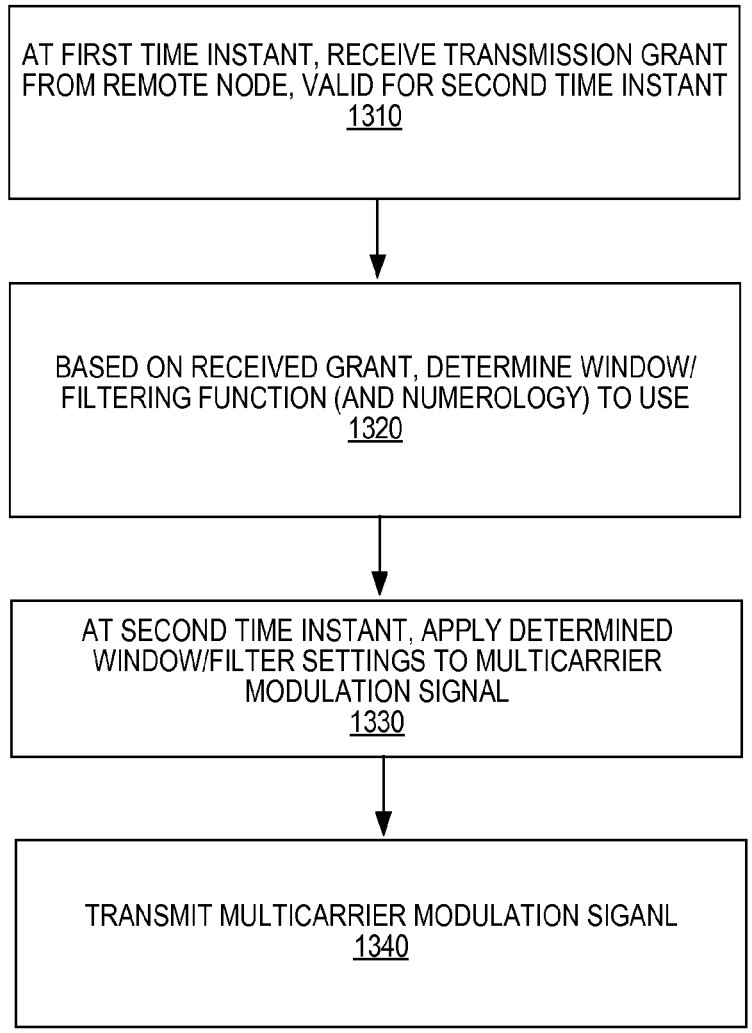

FIG. 13 is a process flow illustrating an example method for implementation in a transmitting device, such as a UE, where resources for transmissions are granted to the transmitting device by another node.

Figure 15:
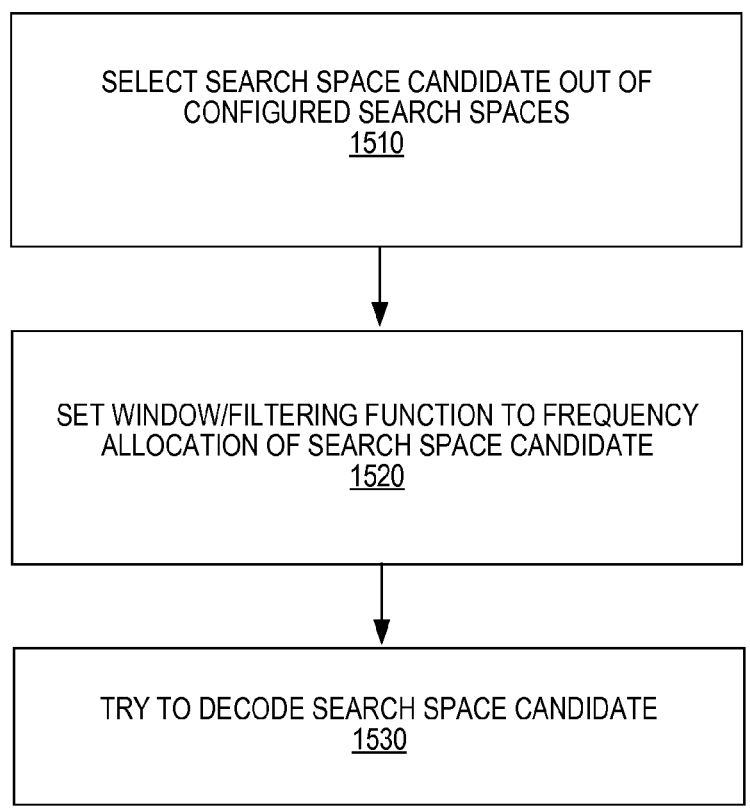

As shown at block 1310, the device at a first time instant receives a transmission grant from a remote node, where the transmission grant is valid for a second time instant. The grant is received by the terminal in one of its search space candidates, in some embodiments. In addition to prior art search space configuration parameters a search space may also include the OFDM numerology (for devices supporting multiple numerologies), for example. One of the search space configuration parameters is the frequency allocation of the search space. When testing a search space candidate the device sets its receive filter/window function adapted to the search space frequency allocation. An example of this is shown in FIG. 15.

As shown at block 1320 of FIG. 13, the device determines, from the grant information, the numerology to be used in the transmission and the allocated resources. The device then also determines the windowing/filtering function to be used. In some embodiments, information indicating the windowing/filtering function is sent in the transmission grant itself, while in other embodiments the window/filter to use is determined by standard, and may be a function of the specific frequency resource allocation for example.

In some embodiments, the filtering/windowing is determined autonomously by the device. Depending on the delay spread of the channel, differently long windows/filters can be used. Again, in environments with small delay spread longer filters/windows can be used than in environments with long delay spread (in order to fit delay spread and filter/window in guard interval). Determination of delay spread can be determined by the receiver or the remote node can provide the device with information indicating delay spread, effective length of the window/filter to use, or even the window/filter to use. The device may also decide to adapt the filter/window depending on the modulation used in the data transmission (which is known from the received control message); modulation schemes with high spectrum efficiency require high SINR and the device may choose a window/filter with higher interference suppression (longer window/filter) than for transmissions with lower spectrum efficiency. Also, guard interval selection can be done based on parameters like SINR requirements, window/filter lengths and guard band etc.

As shown at block 1330, at the second time instant, the device applies the determined windowing/filtering settings to create the multicarrier modulation signal. The windowed/filtered multicarrier modulation signal is transmitted according to the defined settings, as shown at block 1340.

Figure 14:
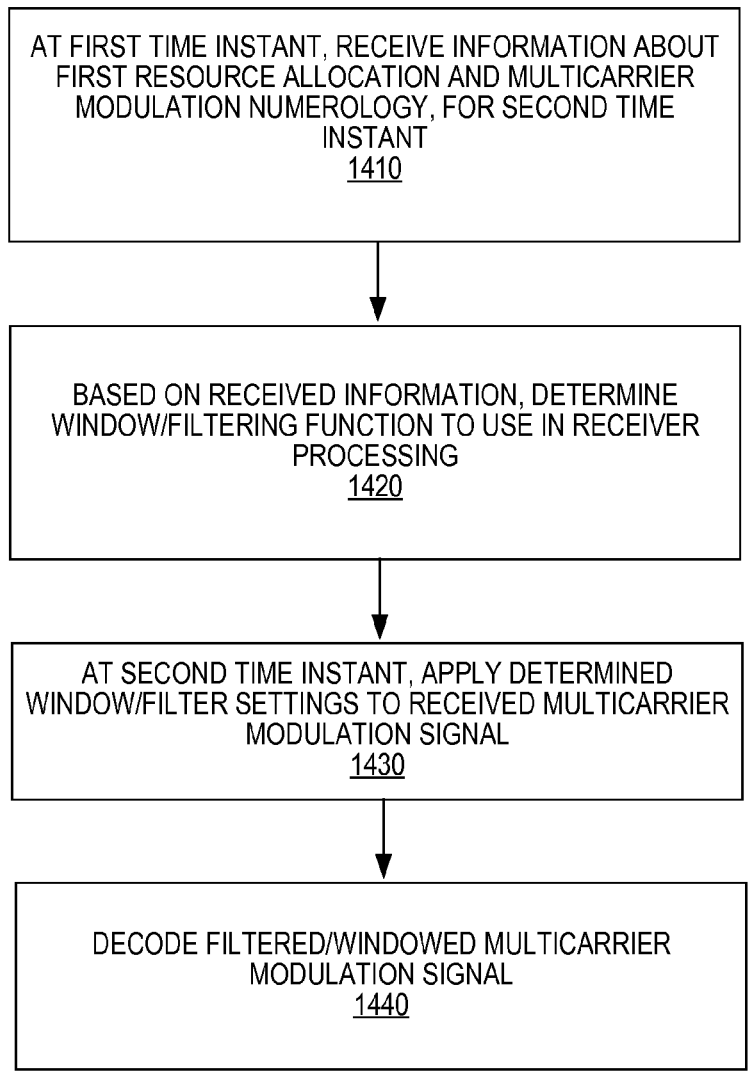

FIG. 14 is a process flow illustrating an example method carried out in a receiving node that receives multicarrier modulation transmissions according to a scheduling grant sent to the receiving node. As shown at block 1410, the receiving node at a first time instant receives information about a first multicarrier modulation numerology (e.g., an OFDM numerology) and a frequency resource allocation (e.g., an OFDM RB allocation), from a remote node. This information is valid for a second time instant, associated with a scheduled reception time. In some embodiments, the grant is received by the receiving node in one of several search space candidates. In addition to search space configuration parameters specified in previously existing OFDM systems, a search space may also include the OFDM numerology (for devices supporting multiple numerologies). One of the search space configuration parameters is the frequency allocation of the search space. In some of these embodiments, when testing a search space candidate, the device sets its receive filter/window function adapted to the search space frequency allocation.

As shown at block 1420, the receiving node determines the window/filtering function to apply on the received OFDM signal at the second time instant, based on the information in the received scheduling grant. In some embodiments, that information is sent in the grant itself, while in other embodiments the window/filter to use is determined by standard (and a function of the RB allocation etc.). In other embodiments, the filter/window is determined autonomously by the receiving node. Depending on the delay spread of the channel, differently long windows/filter can be used—in environments with small delay spread longer filters/windows can be used than in environments with long delay spread (in order to fit delay spread and filter/window in guard interval). Determination of delay spread can be determined by the receiving node, or the remote node can provide the receiving node with information indicating delay spread, effective length of the window/ filter to use, or even the window/filter to use. The receiving node may also decide to adapt the filter/window depending on the modulation used in the data transmission (which is known from the received control message); modulation schemes with high spectrum efficiency require high SINR and the UE may choose a window/filter with higher interference suppression (longer window/filter) than for transmissions with lower spectrum efficiency. Also guard interval selection can be done based on parameters like SINR requirements, window/filter lengths and guard band etc.

As shown at block 1430, at the second time instant, the receiving applies the determined window/filter setting to received OFDM signal. 430. Then the received signal is decoded according to well-known principles.

It should be appreciated that in some embodiments of any of the methods illustrated in FIGS. 11-14, the filtering/windowing operation can be completely switched off based on service (i.e. SINR) requirements. For instance, if low SINR is required, then windowing/filtering could be switched off and hence only the guard band may be adapted, based on service requirements, etc.

FIG. 15 is a process flow diagram illustrating how the receiving of a transmission grant or receiver scheduling grant may depend on a window/filter applied to a multicarrier modulation signal. As shown at block 1510, the node receiving a transmission grant or receiver scheduling grant selects a search space candidate from one of a plurality of configured search spaces. As shown at block 1520, the node's receiver applies a predefined window/filter that corresponds to the frequency allocation of the search space candidate. As shown at block 1530, the node attempts to decode the search space candidate.

Figure 16:
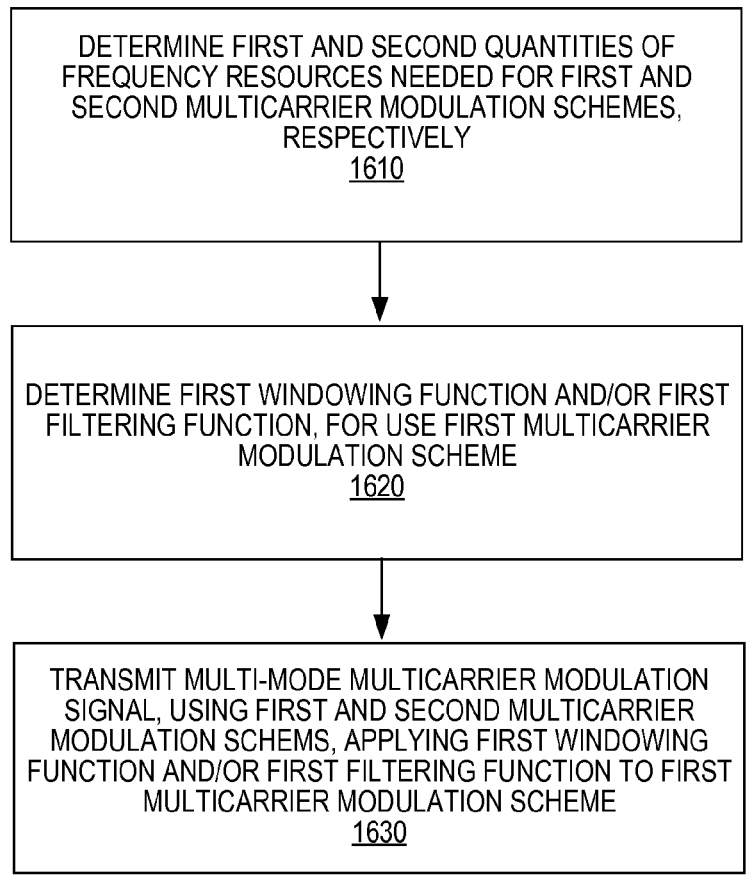
Figure 17:
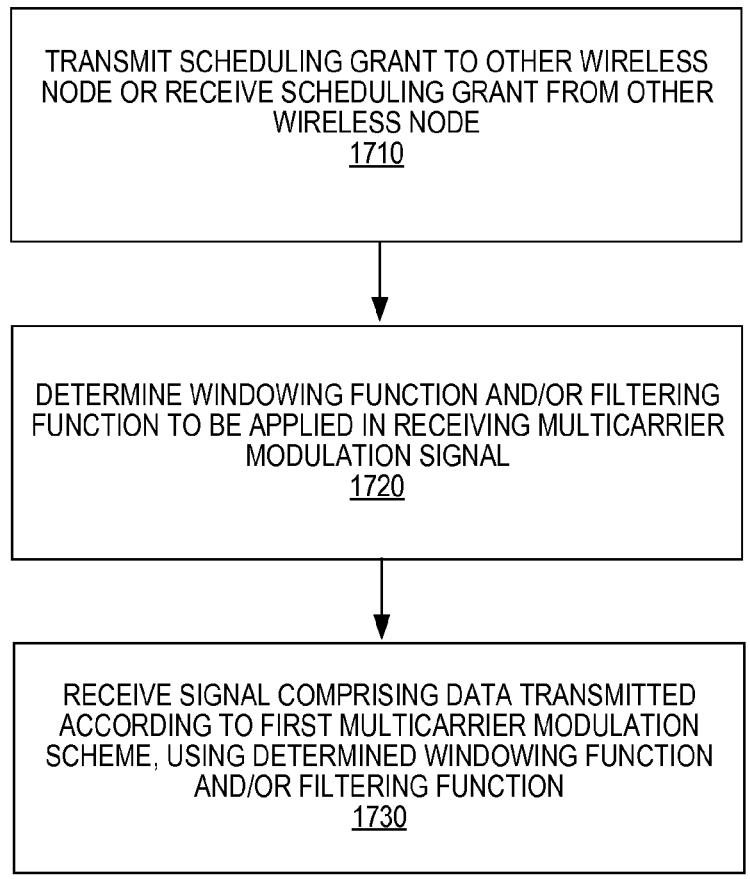
Figure 18:
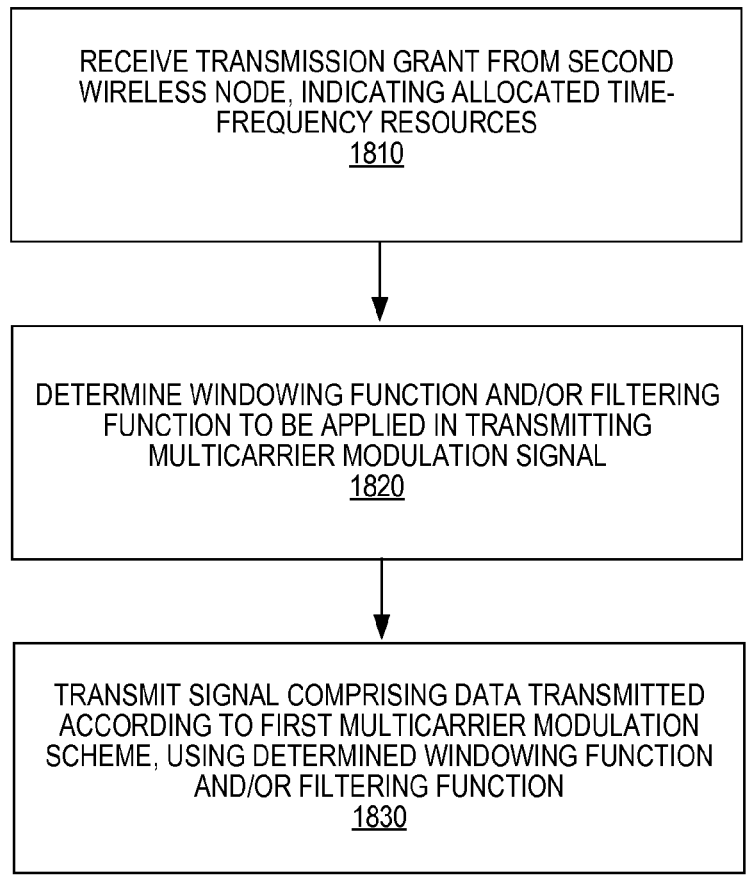

Given the detailed discussion and examples provided above, it will be appreciated that FIGS. 16, 17, and 18 are process flows illustrating, somewhat more generally, example methods according to the presently disclosed techniques.

FIG. 16 illustrates a first example of a method, implemented in a wireless node for a first time interval. As shown at block 1610, the method comprises determining first and second quantities of frequency resources needed for first and second multicarrier modulation schemes, respectively, the first and second multicarrier modulation schemes having first and second subcarrier spacings, respectively, with the first subcarrier spacing differing from the second subcarrier spacing. As shown at block 1620, the method further includes determining a first windowing function and/or first filtering function, for use with the first multicarrier modulation scheme, based on at least one of the first and second quantities of frequency resources. Finally, as shown at block 1630, the illustrated method includes transmitting a multi-mode multi-carrier modulation signal in a frequency band, during the first interval, using the first and second multicarrier modulation schemes and the first and second quantities of frequency resources. Transmitting the multi-mode multi-carrier modulation signal comprises applying the first windowing and/or first filtering function to the first multicarrier modulation scheme.

In some embodiments of the method shown in FIG. 16, determining the first and second quantities of frequency resources comprises determining at least the first quantity of frequency resources based on one or more of: data traffic requirements; data services used by one or more wireless devices; and radio channel characteristics for the frequency band. In some embodiments, the first quantity of frequency resources is determined first, and the second quantity of frequency resources is determined subsequently, based on the first quantity of frequency resources. In some of these latter embodiments, the second quantity of frequency resources may be further based on a guard band needed between frequency resources used for the first multicarrier modulation scheme and frequency resources used for the second multicarrier modulation scheme.

In some embodiments of the illustrated method, a guard band to be applied between frequency resources used for the first multicarrier modulation scheme and frequency resources used for the second multicarrier modulation scheme is determined, based on the first multicarrier modulation scheme and the first quantity of frequency resources. In some of these embodiments, determining the guard band to be applied between frequency resources used for the first multicarrier modulation scheme and frequency resources used for the second multicarrier modulation scheme is further based on one or more of: an expected delay spread for the transmitted signal as received by one or more wireless devices; and a signal quality requirement for the first multicarrier modulation scheme and/or the second multicarrier modulation scheme.

In some embodiments of the method shown in FIG. 16, determining the first windowing function and/or first filtering function is based on a total allocation of frequency resources and is further based on or more of: data services used by one or more wireless devices; and radio channel characteristics for the frequency band. In some embodiments, determining the first windowing function and/or first filtering function is based on an expected delay spread for the transmitted signal as received by one or more wireless devices.

In some embodiments, the method further includes determining a second windowing function and/or second filtering function, for use with the second multicarrier modulation scheme, based on a guard band to be applied between frequency resources used for the first multicarrier modulation scheme and frequency resources used for the second multicarrier modulation scheme. In these embodiments, transmitting the multi-mode multi-carrier modulation signal comprises applying the second windowing and/or second filtering function to the second multicarrier modulation scheme. In some of these latter embodiments, determining the second windowing function and/or the second filtering function is based on signal quality requirements corresponding to the first and/or second multicarrier modulation schemes.

In some embodiments of the method shown in FIG. 16, the first windowing function and/or first filtering function comprises a finite-impulse response (FIR) filter. In these embodiments, determining the first windowing function and/or first filtering function comprises determining a number of taps and tap coefficients for the FIR filter. In other embodiments, the first windowing function and/or first filtering function comprises a time-domain window to be applied to each symbol in the first multicarrier modulation scheme, in which case determining the first windowing function and/or first filtering function comprises determining a window type and a window length for the time-domain window.

The process flow of FIG. 16 applies to a first time interval. It will be appreciated that one or more of the illustrated steps may be repeated for a second time interval, where the windowing function and/or filtering function is adapted, depending on changed conditions. Thus, in some embodiments of the illustrated method, the method further comprises, for a second time interval, changing one or more of: the first and/or second multicarrier modulation schemes; the first and/or second quantities of frequency resources; the first windowing function and/or first filtering function; and the second windowing function and/or second filtering function.

FIG. 17 is a processing flow illustrating an example method carried out in a wireless node operating in a wireless communication system in which at least first and second multicarrier modulation schemes having different subcarrier spacings are used. Looking first at block 1720, it can be seen that the method includes determining, for a first time interval, a windowing function and/or filtering function to be applied in receiving a signal transmitted according to the first multicarrier modulation scheme. As shown at block 1730, the method further includes receiving, in a frequency band, a signal comprising data transmitted in first time-frequency resources according to the first multicarrier modulation scheme, wherein receiving the signal comprises applying the determined windowing function and/or filtering scheme to the signal.

In some embodiments, the method further includes transmitting to a second wireless node, prior to said receiving, a scheduling grant for use by the second wireless node in transmitting the signal. The scheduling grant indicates or implies the windowing function and/or filtering function to be used by the second wireless node for transmitting the signal. This is shown as one of two possible alternatives in block 1710. In other embodiments, the method further includes receiving information about the first multicarrier modulation scheme and the first time-frequency resources in a scheduling grant received from a second wireless node. Again, the scheduling grant indicates or implies the windowing function and/or filtering function to be applied by the first wireless node to the signal. This is shown as another alternative in block 1710. In some of these latter embodiments, the particular search space in which the scheduling grant is received implies the windowing function and/or filtering function.

In some embodiments of the method shown in FIG. 17, determining the windowing function and/or filtering function to be applied in receiving the signal comprises identifying the windowing function and/or filtering function using a look-up table, based on allocated frequency resources and/or a multicarrier modulation scheme numerology indicated in or implied by the scheduling grant. In some embodiments, determining the windowing function and/or filtering function to be applied in receiving the signal is based on a numerology for the first multicarrier modulation scheme and one or more of: an expected delay spread for the received signal; and a signal quality requirement for the multicarrier modulation scheme.

FIG. 18 is a process flow diagram illustrating another example method implemented in a first wireless node operating in a wireless communication system in which at least first and second multicarrier modulation schemes having different subcarrier spacings are used. This method is applicable to a transmitting node that receives a transmission grant.

As shown at block 1810, the illustrated method includes receiving a transmission grant from a second wireless node, the transmission grant comprising information about allocated time-frequency resources for use by the first wireless node in a first time interval. As shown at block 1820, the method further includes determining a windowing function and/or filtering function to be applied by the first wireless node in transmitting in the first time interval. Finally, as shown at block 1830, the method includes transmitting, in the first time interval and in a frequency band, a signal comprising data transmitted in the allocated time-frequency resources according to the first multicarrier modulation scheme. Transmitting the signal comprises applying the windowing function and/or filtering scheme to the signal.

In some embodiments of the method shown in FIG. 18, the transmission grant indicates or implies a windowing function and/or filtering function to be applied by the first wireless node. Determining the windowing function and/or filtering function to be applied by the first wireless node in these embodiments may comprise identifying the windowing function and/or filtering function using a look-up table, based on the allocated time-frequency resources and/or a multicarrier modulation scheme numerology indicated in or implied by the transmission grant.

In some embodiments, a search space in which the transmission grant is received implies the windowing function and/or filtering function. In some embodiments, determining the windowing function and/or filtering function is based on a numerology for the first multicarrier modulation scheme and one or more of: an expected delay spread for the received signal; and a signal quality requirement for the multicarrier modulation scheme.

The methods illustrated in FIGS. 11-18, and the variants discussed above, may, as a general matter, be implemented in any wireless node configured to support two or more multicarrier modulation schemes in a given frequency bandwidth. In some embodiments, for example, the methods illustrated in FIGS. 16 and 17 are implemented in a wireless base station of a wireless communications network, and the methods illustrated in FIGS. 17 and 18 are implemented in a mobile terminal. It should be understood, however, that the techniques described herein are not limited to such a configuration. The techniques could be implemented in the reverse manner, for example. In some systems, wireless devices may be configured to carry out both methods, with respect to allocations for outbound transmissions, for example.

Figure 19:
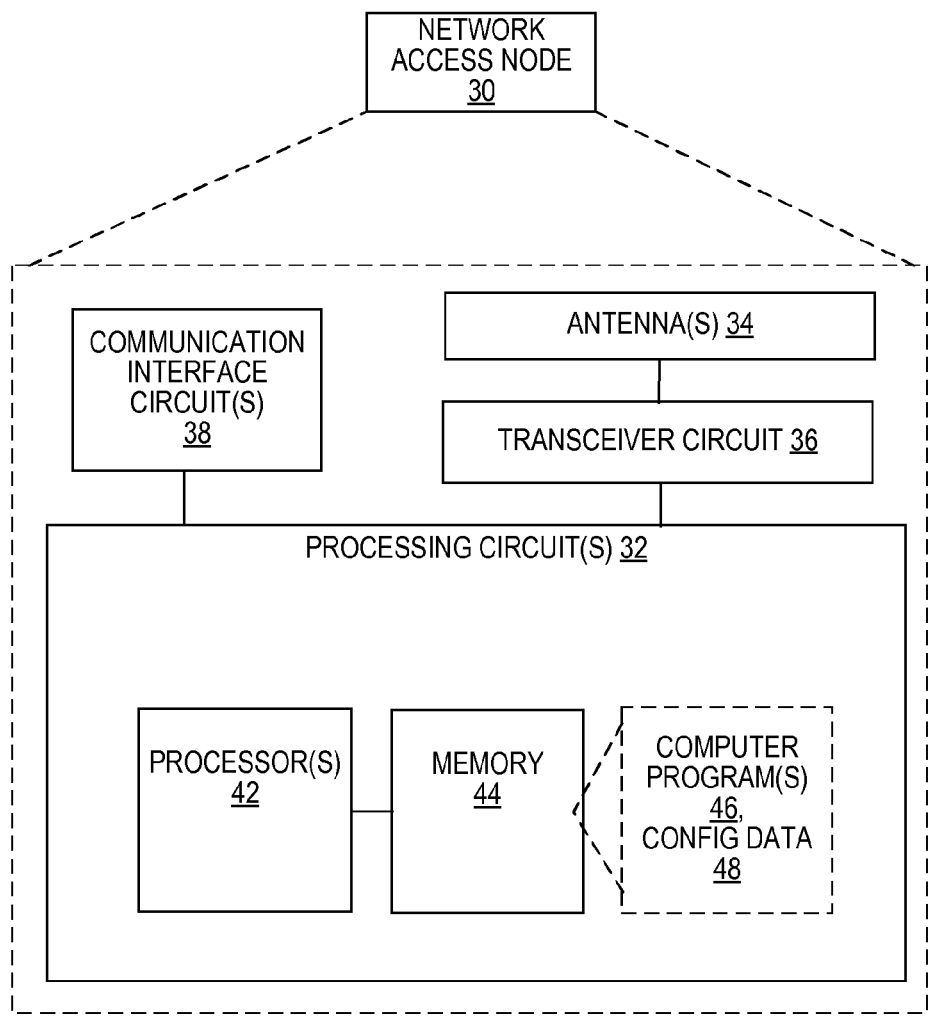
FIG. 19 illustrates a block diagram of a network access node, according to some embodiments.
Figure 20:
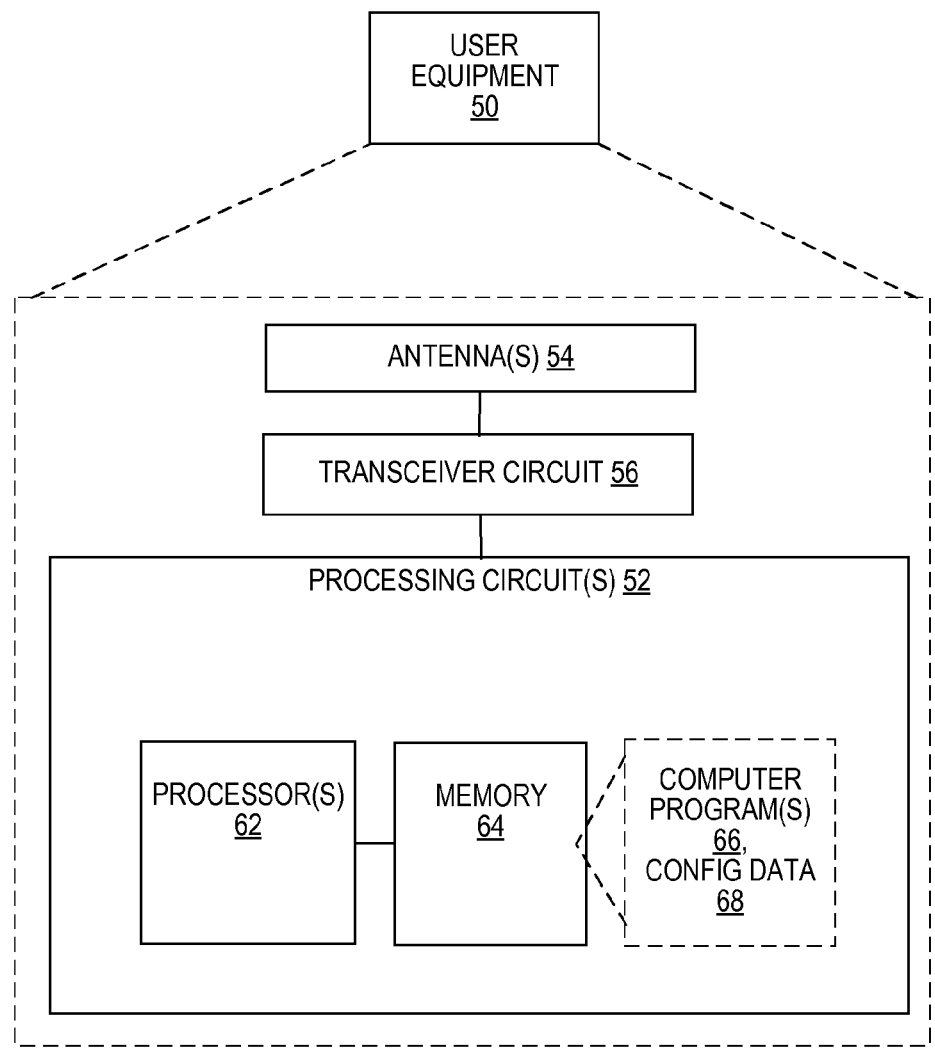
FIG. 20 illustrates a block diagram of a user equipment, according to some embodiments.

FIGS. 19 and 20 illustrate features of an example network access node (e.g., a wireless base station) and a user equipment, respectively. In the detailed discussion of those figures that follows, it is assumed that the techniques corresponding to FIGS. 16 and 17 are implemented in the network access node of FIG. 19 while the techniques corresponding to FIG. 18 are implemented in the user equipment of FIG. 20. Again, however, it should be understood that the reverse situation may apply, in some cases, or that embodiments of both techniques may be implemented in a single wireless device.

FIG. 19 illustrates a diagram of a network access node 30, such as a base station, according to some embodiments. The network node 30 facilitates communication between wireless devices and the core network. The network access node 30 includes a communication interface circuit 38 includes circuitry for communicating with other nodes in the core network, radio nodes, and/or other types of nodes in the network for the purposes of providing data and cellular communication services. The network access node 30 communicates with wireless devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network access node 30 also includes one or more processing circuits 32 that are operatively associated with the communication interface circuit 38 or transceiver circuit 36. The network access node 30 uses the communication interface circuit 38 to communicate with network nodes and the transceiver 36 to communicate with user equipments. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multicore, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network access node 30. Here, "non-transitory" means permanent, semi-permanent, or at least temporarily persistent storage and encompasses both long-term storage in non-volatile memory and storage in working memory, e.g., for program execution.

According to various embodiments of the techniques described herein, a transmitter node and/or a receiver node can perform communications using various combinations of the multicarrier modulation and demodulation techniques described in FIGS. 5-9, or other multicarrier modulation techniques. For example, referring back to FIG. 19, the processor 42 of the processing circuit 32 of network access node 30 may execute a computer program 46 stored in the memory 44 that configures the processor 42 to operate the network access node 30 as a transmitter node that performs multicarrier modulation. Processing circuit 32 may comprise specialized digital hardware for performing DFT/IDFT processing, in cooperation with one or more program-based processors, in some embodiments.

In some embodiments, processor 42 is configured, for example, to determine first and second quantities of frequency resources needed for first and second multicarrier modulation schemes, respectively, the first and second multicarrier modulation schemes having first and second subcarrier spacings, respectively, the first subcarrier spacing differing from the second subcarrier spacing; to determine a first windowing function and/or first filtering function, for use with the first multicarrier modulation scheme, based on at least one of the first and second quantities of frequency resources; and to transmit, using the radio transceiver circuit (36), a multi-mode multi-carrier modulation signal in a frequency band, during the first interval, using the first and second multicarrier modulation schemes and the first and second quantities of frequency resources, wherein said transmitting the multi-mode multi-carrier modulation signal comprises applying the first windowing and/or first filtering function to the first multicarrier modulation scheme.

In other embodiments, processor 42 is configured, for example, to determine, for a first time interval, a windowing function and/or filtering function to be applied in receiving a signal transmitted according to the first multicarrier modulation scheme; and to receive in a frequency band, using the radio transceiver circuit (32), a signal comprising data transmitted in first time-frequency resources according to the first multicarrier modulation scheme, wherein receiving the signal comprises applying the determined windowing function and/or filtering scheme to the signal.

The network access node 30 shown in FIG. 19 may be referred to as a node, network node or a radio network node. Network access node 30 can be any kind of network access node that may include a base station, radio base station, base transceiver station, evolved Node B (eNodeB), Node B, relay node, access point, wireless access point, radio access point, UltraDense Network (UDN)/Software Defined Network (SDN) radio access node, Remote Radio Unit (RRU), Remote Radio Head (RRH), etc.

FIG. 20 illustrates a diagram of a wireless device, such as a user equipment 50, according to some embodiments. To ease explanation, the user equipment 50 may also be considered to represent any wireless device that may operate in a network. The UE 50 herein can be any type of wireless device capable of communicating with network node or another UE over radio signals. The UE 50 may also be radio communication device, target device, device to device (D2D) UE, machine type UE or UE capable of machine to machine communication (M2M), a sensor equipped with UE, PDA (personal digital assistant), Tablet, mobile terminals, smart phone, laptop embedded equipped (LEE), laptop mounted equipment (LME), USB dongles, Customer Premises Equipment (CPE), etc.

The UE 50 communicates with a radio node or base station, such as network access node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50, e.g., using processing circuitry 52, may be configured to perform all or some of the modulation and demodulation techniques illustrated in FIGS. 5-9. For example, the processor 62 of the processor circuit 52 may execute a computer program 66 stored in the memory 64 that configures the processor 62 to operate as the second wireless node, as discussed above. The processing circuit 52 of the UE 50 may thus be configured to perform one or more methods as disclosed above, such as the methods illustrated in FIGS. 17 and 18, and variants thereof.

For instance, the processing circuit 52 may be configured, in some embodiments, to determine, for a first time interval, a windowing function and/or filtering function to be applied in receiving a signal transmitted according to the first multicarrier modulation scheme; and to receive in a frequency band, using the radio transceiver circuit 56, a signal comprising data transmitted in first time-frequency resources according to the first multicarrier modulation scheme, where receiving the signal comprises applying the determined windowing function and/or filtering scheme to the signal.

In some embodiments, the processing circuit may be configured to receive a transmission grant from a second wireless node, using the radio transceiver circuit 56, the transmission grant comprising information about allocated time-frequency resources for use by the first wireless node in a first time interval; to determine a windowing function and/or filtering function to be applied by the first wireless node in transmitting in the first time interval; and to transmit in the first time interval and in a frequency band, using the radio transceiver circuit 56, a signal comprising data transmitted in the allocated time-frequency resources according to the first multicarrier modulation scheme, wherein transmitting the signal comprises applying the windowing function and/or filtering scheme to the signal.

It should be appreciated that the processing circuits 32 and 52 of FIGS. 19 and 20, respectively, can be understood to implement a number of functional modules, where each functional module may represent a module of software or firmware executing on a processing circuit, or a functional grouping of digital hardware, or a combination of both. Each functional module may correspond to one or more of the steps illustrated in the process flow diagrams of FIGS. 11-18, for example.

Among the advantages of the various techniques described herein is that they enable better resource utilization in a system using filtered OFDM or windowed OFDM or, more generally, using multi-mode multicarrier modulation. By facilitating better resource utilization, these techniques can increase system capacity in a wireless system.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a wireless node, the method comprising, for a first time interval:
   determining first and second quantities of frequency resources needed for first and second multicarrier modulation schemes, respectively, the first and second multicarrier modulation schemes having first and second subcarrier spacings, respectively, the first subcarrier spacing differing from the second subcarrier spacing;
   determining a first windowing function and/or first filtering function, for use with the first multicarrier modulation scheme, based on at least one of the first and second quantities of frequency resources, wherein the first windowing function and/or first filtering function comprises a time-domain window to be applied to each symbol in the first multicarrier modulation scheme, and wherein determining the first windowing function and/or first filtering function comprises determining a window type and a window length for the time-domain window; and
   transmitting a multi-mode multi-carrier modulation signal in a frequency band, during the first time interval, using the first and second multicarrier modulation schemes and the first and second quantities of frequency resources, wherein transmitting the multi-mode multi-carrier modulation signal comprises applying the first windowing and/or first filtering function to the first multicarrier modulation scheme.

2. The method of claim 1, wherein determining the first and second quantities of frequency resources comprises determining at least the first quantity of frequency resources based on one or more of:
   data traffic requirements;
   data services used by one or more wireless devices; and
   radio channel characteristics for the frequency band.

3. The method of claim 1, further comprising determining a guard band to be applied between frequency resources used for the first multicarrier modulation scheme and frequency resources used for the second multicarrier modulation scheme, based on the first multicarrier modulation scheme and the first quantity of frequency resources.

4. The method of claim 3, wherein determining the guard band to be applied between frequency resources used for the first multicarrier modulation scheme and frequency resources used for the second multicarrier modulation scheme is further based on one or more of:
   an expected delay spread for the transmitted signal as received by one or more wireless devices; and
   a signal quality requirement for the first multicarrier modulation scheme and/or the second multicarrier modulation scheme.

5. The method of claim 1, wherein determining the first windowing function and/or first filtering function is based on a total allocation of frequency resources and is further based on one or more of:
   data services used by one or more wireless devices; and
   radio channel characteristics for the frequency band.

6. The method of claim 1, wherein determining the first windowing function and/or first filtering function is based on an expected delay spread for the transmitted signal as received by one or more wireless devices.

7. The method of claim 1, further comprising determining a second windowing function and/or second filtering function, for use with the second multicarrier modulation scheme, based on a guard band to be applied between frequency resources used for the first multicarrier modulation scheme and frequency resources used for the second multicarrier modulation scheme, and wherein transmitting the multi-mode multi-carrier modulation signal comprises applying the second windowing and/or second filtering function to the second multicarrier modulation scheme.

8. The method of claim 7, wherein determining the second windowing function and/or the second filtering function is based on signal quality requirements corresponding to the first and/or second multicarrier modulation schemes.

9. The method of claim 1, wherein the first windowing function and/or first filtering function comprises a finite-impulse response (FIR) filter, and wherein determining the first windowing function and/or first filtering function comprises determining a number of taps and tap coefficients for the FIR filter.

10. The method of claim 1, further comprising, for a second time interval, changing one or more of:
    the first and/or second multicarrier modulation schemes;
    the first and/or second quantities of frequency resources;
    the first windowing function and/or first filtering function; and
    the second windowing function and/or second filtering function.

11. A method, in a first wireless node operating in a wireless communication system in which at least first and second multicarrier modulation schemes having different subcarrier spacings are used, the method comprising:
    receiving information about the first multicarrier modulation scheme and the first time-frequency resources in a scheduling grant received from a second wireless node;
    determining, for a first time interval, a windowing function and/or filtering function to be applied in receiving a signal transmitted according to the first multicarrier modulation scheme, wherein a search space in which the scheduling grant is received implies the windowing function and/or filtering function to be applied by the first wireless node to the signal; and
    receiving, in a frequency band, a signal comprising data transmitted in first time-frequency resources according to the first multicarrier modulation scheme, wherein receiving the signal comprises applying the determined windowing function and/or filtering function to the signal.

12. The method of claim 11, further comprising transmitting to a second wireless node, prior to said receiving, a scheduling grant for use by the second wireless node in transmitting the signal, wherein the scheduling grant indicates or implies the windowing function and/or filtering function to be used by the second wireless node for transmitting the signal.

13. The method of claim 11, wherein determining the windowing function and/or filtering function to be applied in receiving the signal is based on a numerology for the first multicarrier modulation scheme and one or more of:
    an expected delay spread for the received signal; and
    a signal quality requirement for the first multicarrier modulation scheme and/or the second multicarrier modulation scheme.

14. A method, in a first wireless node operating in a wireless communication system in which at least first and second multicarrier modulation schemes having different subcarrier spacings are used, the method comprising:
    receiving a transmission grant from a second wireless node, the transmission grant comprising information about allocated time-frequency resources for use by the first wireless node in a first time interval;

determining a windowing function and/or filtering function to be applied by the first wireless node in transmitting in the first time interval, wherein the first windowing function and/or first filtering function comprises a time-domain window to be applied to each symbol in the first multicarrier modulation scheme, and wherein determining the first windowing function and/or first filtering function comprises determining a window type and a window length for the time-domain window; and transmitting, in the first time interval and in a frequency band, a signal comprising data transmitted in the allocated time-frequency resources according to the first multicarrier modulation scheme, wherein transmitting the signal comprises applying the windowing function and/or filtering function to the signal.

15. The method of claim 14, wherein determining the windowing function and/or filtering function is based on a numerology for the first multicarrier modulation scheme and one or more of:

an expected delay spread for the received signal; and a signal quality requirement for the first multicarrier modulation scheme and/or the second multicarrier modulation scheme.

16. A wireless node, comprising:

a transceiver circuit; and a processing circuit operatively coupled to the transceiver circuit and configured to:

determine first and second quantities of frequency resources needed for first and second multicarrier modulation schemes, respectively, the first and second multicarrier modulation schemes having first and second subcarrier spacings, respectively, the first subcarrier spacing differing from the second subcarrier spacing;

determine a first windowing function and/or first filtering function, for use with the first multicarrier modulation scheme, based on at least one of the first and second quantities of frequency resources, wherein the first windowing function and/or first filtering function comprises a time-domain window to be applied to each symbol in the first multicarrier modulation scheme, and wherein determining the first windowing function and/or first filtering function comprises determining a window type and a window length for the time-domain window; and transmit a multi-mode multi-carrier modulation signal in a frequency band, using the transceiver circuit, during a first time interval, using the first and second multicarrier modulation schemes and the first and second quantities of frequency resources, wherein said transmitting the multi-mode multi-carrier modulation signal comprises applying the first windowing and/or first filtering function to the first multicarrier modulation scheme.

17. The wireless node of claim 16, wherein the processing circuit is configured to determine at least the first quantity of frequency resources based on one or more of:

data traffic requirements;

data services used by one or more wireless devices; and radio channel characteristics for the frequency band.

18. A first wireless node adapted to operate in a wireless communication system in which at least first and second multicarrier modulation schemes having different subcarrier spacings are used, wherein the wireless node comprises:

a transceiver circuit; and a processing circuit operatively coupled to the transceiver circuit and configured to:

receive information about the first multicarrier modulation scheme and the first time-frequency resources in a scheduling grant received from a second wireless node;

determine, for a first time interval, a windowing function and/or filtering function to be applied in receiving a signal transmitted according to the first multicarrier modulation scheme, wherein a search space in which the scheduling grant is received implies the windowing function and/or filtering function to be applied by the first wireless node to the signal; and receive in a frequency band, using the transceiver circuit, a signal comprising data transmitted in first time-frequency resources according to the first multicarrier modulation scheme, wherein receiving the signal comprises applying the determined windowing function and/or filtering function to the signal.

19. The first wireless node of claim 18, wherein the processing circuit is further configured to use the transceiver circuit to transmit to a second wireless node, prior to said receiving, a scheduling grant for use by the second wireless node in transmitting the signal, wherein the scheduling grant indicates or implies the windowing function and/or filtering function to be used by the second wireless node for transmitting the signal.

20. A first wireless node adapted to operate in a wireless communication system in which at least first and second multicarrier modulation schemes having different subcarrier spacings are used, wherein the first wireless node comprises:

a transceiver circuit; and a processing circuit operatively coupled to the transceiver circuit and configured to:

receive a transmission grant from a second wireless node, using the transceiver circuit, the transmission grant comprising information about allocated time-frequency resources for use by the first wireless node in a first time interval;

determine a windowing function and/or filtering function to be applied by the first wireless node in transmitting in the first time interval, wherein the first windowing function and/or first filtering function comprises a time-domain window to be applied to each symbol in the first multicarrier modulation scheme, and wherein determining the first windowing function and/or first filtering function comprises determining a window type and a window length for the time-domain window; and transmit in the first time interval and in a frequency band, using the transceiver circuit, a signal comprising data transmitted in the allocated time-frequency resources according to the first multicarrier modulation scheme, wherein transmitting the signal comprises applying the windowing function and/or filtering function to the signal.

* * * * *